(12) United States Patent
Sarwat et al.

(10) Patent No.: US 11,507,041 B1
(45) Date of Patent: Nov. 22, 2022

(54) SYSTEMS AND METHODS FOR BOOSTING RESILIENCY OF A POWER DISTRIBUTION NETWORK

(71) Applicants: Arif I. Sarwat, Miami, FL (US); Temitayo O. Olowu, Miami, FL (US); Shamini Dharmasena, Miami, FL (US)

(72) Inventors: Arif I. Sarwat, Miami, FL (US); Temitayo O. Olowu, Miami, FL (US); Shamini Dharmasena, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/661,789

(22) Filed: May 3, 2022

(51) Int. Cl.
*G05B 19/042* (2006.01)
*H02J 3/38* (2006.01)

(52) U.S. Cl.
CPC ............ *G05B 19/042* (2013.01); *H02J 3/381* (2013.01); *G05B 2219/2639* (2013.01); *H02J 2300/24* (2020.01)

(58) Field of Classification Search
CPC ........... G05B 19/042; G05B 2219/2639; H02J 3/381; H02J 2300/24
See application file for complete search history.

(56) References Cited

U.S. PATENT DOCUMENTS

| | | | | |
|---|---|---|---|---|
| 10,732,656 B2 * | 8/2020 | Tyler | ......................... | H02J 3/16 |
| 10,804,736 B2 * | 10/2020 | Sun | ........................... | H02J 3/00 |
| 10,958,211 B1 * | 3/2021 | Sarwat | ..................... | H02J 3/004 |
| 11,056,912 B1 * | 7/2021 | Wells | ....................... | H02J 3/004 |
| 2015/0311718 A1 * | 10/2015 | Divan | ........................ | H02J 3/18 |
| | | | | 323/208 |
| 2017/0040799 A1 * | 2/2017 | Divan | ........................ | G05F 1/66 |
| 2017/0060161 A1 * | 3/2017 | Tyler | .................... | G05B 19/042 |
| 2017/0117716 A1 * | 4/2017 | Wolter | ..................... | H02J 3/381 |
| 2017/0133849 A1 * | 5/2017 | Feng | ........................ | H02J 3/16 |
| 2017/0324671 A1 * | 11/2017 | Zhang | ..................... | H04L 45/64 |
| 2018/0138711 A1 * | 5/2018 | Dall'Anese | ............... | H02J 3/46 |
| 2018/0146489 A1 * | 5/2018 | Jin | ......................... | H04B 7/022 |
| 2018/0233911 A1 * | 8/2018 | Rosendahl | .............. | H02J 3/388 |
| 2019/0004579 A1 * | 1/2019 | Allen-Ware | ........... | G06F 1/3228 |
| 2019/0261139 A1 * | 8/2019 | Fujishiro | ............... | H04W 48/16 |
| 2019/0380078 A1 * | 12/2019 | Fujishiro | ............... | H04W 36/08 |
| 2020/0153273 A1 * | 5/2020 | Sun | ......................... | G05B 17/02 |
| 2020/0203951 A1 * | 6/2020 | Alam | .................... | G05B 19/042 |
| 2021/0210957 A1 * | 7/2021 | Du | ............................ | H02J 3/12 |

(Continued)

OTHER PUBLICATIONS

Power System Resilience to Extreme Weather: Fragility Modeling, Probabilistic Impact Assessment, and Adaptation Measures; by Mathaios Panteli; pp. 3747-3757; Sep. 2017.*

*Primary Examiner* — Ramesh B Patel

(74) *Attorney, Agent, or Firm* — Saliwanchik, Lloyd & Eisenschenk

(57) ABSTRACT

Systems and methods for boosting resiliency of a power distribution network (PDN) are provided. A distributed energy resource (DER) hosting process can be used to boost network resiliency through the use of locally installed DER systems that can be operated, dispatched, and/or controlled as individual power plants. A unique critical infrastructure (CI) ranking scheme can be used to prioritize CIs to be optimally located close to the DER while increasing the DER hosting capacity of the network.

20 Claims, 28 Drawing Sheets

(56) References Cited

U.S. PATENT DOCUMENTS

| | | | |
|---|---|---|---|
| 2022/0102946 A1* | 3/2022 | Craft, Jr. | G06F 1/266 |
| 2022/0109622 A1* | 4/2022 | Yeh | H04L 69/22 |
| 2022/0124560 A1* | 4/2022 | Yeh | H04W 28/26 |
| 2022/0126864 A1* | 4/2022 | Moustafa | B60W 60/001 |

* cited by examiner

| Load Type | $R_i^{SI}$ | $\mathbf{R}_{N,i}^{SI}$ | $S_i^L$ (kVA) | $\mathbf{S}_{N,i}^L$ | $D_i$ (km) | $\mathbf{D}_{N,i}$ | $\omega_i$ |
|---|---|---|---|---|---|---|---|
| RES$_1$ | 5 | 0.109 | 107.7 | 0.071 | 53.5 | 0.121 | 0.103 |
| HOS | 1 | 0.182 | 151.3 | 0.100 | 55.1 | 0.125 | 0.161 |
| FR | 2 | 0.164 | 76.8 | 0.051 | 56.6 | 0.128 | 0.139 |
| CH | 7 | 0.073 | 34.2 | 0.022 | 57.7 | 0.131 | 0.068 |
| SM | 10 | 0.018 | 513.1 | 0.337 | 56.5 | 0.128 | 0.089 |
| SUP$_2$ | 9 | 0.036 | 76.8 | 0.051 | 34.8 | 0.079 | 0.043 |
| WPS | 4 | 0.127 | 458.9 | 0.302 | 52.7 | 0.119 | 0.160 |
| POL | 3 | 0.145 | 50.2 | 0.033 | 41.3 | 0.094 | 0.119 |
| R2 | 6 | 0.091 | 17.9 | 0.012 | 31.6 | 0.072 | 0.074 |
| SUP$_1$ | 8 | 0.055 | 33.5 | 0.021 | 1.3 | 0.003 | 0.044 |

FIG. 12

| POS | DER placement $\mathcal{N}_{pv}$ | | | | | Objective function | | |
|---|---|---|---|---|---|---|---|---|
| | | | | | | $OF_1$ | $OF_2$ | $OF_3$ |
| 1 | 816 | 852 | 814 | 834 | 830 | 0.89 | 0.61 | 77.15 |
| 2 | 832 | 828 | 860 | 816 | 834 | 0.94 | 1.91 | 138.83 |
| 3 | 858 | 840 | 860 | 842 | 806 | 0.86 | 2.55 | 137.59 |
| 4 | 834 | 844 | 854 | 814 | 812 | 0.86 | 0.98 | 104.79 |
| 5 | 824 | 830 | 852 | 814 | 812 | 0.77 | 3.08 | 42.51 |
| 6 | 824 | 848 | 816 | 834 | 830 | 0.84 | 1.58 | 121.84 |
| 7 | 816 | 830 | 848 | 850 | 814 | 0.84 | 0.74 | 98.12 |
| 8 | 816 | 852 | 814 | 834 | 830 | 0.89 | 0.61 | 77.15 |
| 9 | 850 | 816 | 846 | 828 | 824 | 0.84 | 1.19 | 116.83 |
| 10 | 846 | 840 | 842 | 858 | 832 | 0.87 | 2.32 | 143.50 |
| 11 | 854 | 828 | 846 | 824 | 850 | 0.89 | 0.89 | 114.53 |
| 12 | 806 | 828 | 812 | 830 | 854 | 0.72 | 4.10 | 61.72 |
| 13 | 846 | 828 | 830 | 824 | 854 | 0.89 | 0.74 | 110.04 |
| 14 | 824 | 848 | 850 | 858 | 830 | 0.88 | 1.31 | 125.78 |
| 15 | 824 | 830 | 852 | 814 | 812 | 0.77 | 3.08 | 42.51 |
| 16 | 832 | 830 | 860 | 850 | 834 | 0.94 | 1.74 | 134.96 |
| 17 | 830 | 834 | 842 | 816 | 854 | 0.89 | 1.08 | 125.53 |
| 18 | 848 | 844 | 814 | 806 | 832 | 0.86 | 1.44 | 129.68 |

FIG. 13

SYSTEMS AND METHODS FOR BOOSTING RESILIENCY OF A POWER DISTRIBUTION NETWORK

GOVERNMENT SUPPORT

This invention was made with government support under 1553494 awarded by the National Science Foundation (NSF). The government has certain rights in the invention.

BACKGROUND

In the context of energy systems, power resilience indicates the strength of the system against high-impact, low-frequency events such as natural disasters (e.g., tornadoes, hurricanes, earthquakes, wildfires), cyber-attacks, and human-physical activities. Such events can be referred to as extreme events. More specifically, resilience can be indication of a system's ability to anticipate, prepare for, and adapt to changing conditions and withstand, respond to, and recover rapidly from disruptions through sustainable, adaptable, and holistic planning and technical solutions. Power system fails occur even during normal weather due to progressive degradation of system components, human factors, and other reasons. Though, the impact on power systems due to extreme events is severe as it is mostly unpredictable, progresses so fast, and can cause faults in several locations simultaneously. It also can be hard to physically access the fault locations in order to start the restoration process while an extreme event progresses. The topic of resilience in power systems has gained increased attention due to frequent intensified extreme weather events, increasing digitization of society and shifting consumer expectations, increasing vulnerability to cyber-attacks, and vulnerability due to increased dependence on natural gas for electric power.

BRIEF SUMMARY

Embodiments of the subject invention provide novel and advantageous systems and methods for boosting resiliency of a power distribution network (PDN). A distributed energy resource (DER) hosting process or algorithm can be used to boost network resiliency through the use of locally installed DER systems that can be operated, dispatched, and/or controlled as individual power plants. The process or algorithm can incorporate a unique critical infrastructure (CI) ranking scheme to prioritize CIs to be optimally located close to the DER while increasing the DER hosting capacity of the network. Systems and methods of embodiments of the subject invention can be used by distribution planners and designers to apply directly to a multitude of network substations to improve the overall system's resiliency through grid-scale situation awareness.

In an embodiment, a system for boosting resiliency of a PDN can comprise: a processor; and a (non-transitory) machine-readable medium in operable communication with the processor and/or the PDN, and having instructions stored thereon that, when executed by the processor, perform the following steps: i) identifying CI nodes within the PDN; ii) ranking the CI nodes based on cost of power loss, with the CI node having the highest cost of power loss being ranked as a most important CI node; and iii) performing a multi-objective optimization to determine locations to place DERs within the PDN, based on the ranking of the CI nodes, to boost the resiliency of the PDN. The system can further comprise the DERs themselves and/or the PDN itself. The ranking of the CI nodes can utilize: a first criterion of a social importance of the respective CI node; a second criterion of an apparent power rating of a power load of the respective CI node; and/or a third criterion of a proximity to a substation of the respective CI node. The ranking of the CI nodes can utilize an analytic hierarchy process (AHP) on the first criterion, the second criterion, and/or the third criterion, and/or can compare the first criterion, the second criterion, and the third criterion pairwise (e.g., using a semantic scale, such as the semantic scale of Saaty). After the AHP and pairwise comparison, the first criterion can have an assigned weight of, e.g., about 0.72 (or 0.724), the second criterion can have an assigned weight of, e.g., about 0.19 (or 0.193), and/or the third criterion can have an assigned weight of, e.g., about 0.08 (or 0.083). The multi-objective optimization can comprise utilizing a first objective function, a second objective function, and a third objection objective. The first objective function can maximize a base resilience of the PDN; the second objective function can optimize sizing and placement of the DERs; and/or the third objective function can minimize overall power loss of the PDN. The first objective function ($OF_1$), the second objective function ($OF_2$), and the third objective function ($OF_3$) can be as shown in Equations (5), (6), and (7), respectively, herein. The multi-objective optimization can comprise utilizing power flow constraints, capacitor banks reactive power and voltage regulator tap constraints, and/or a nodal voltage constraint. The multi-objective optimization can comprise using a sorting and multi-objective algorithm to generate an initial population of variables. The DERs can be, for example, photovoltaic (PV) cells.

In another embodiment, a method for boosting resiliency of a PDN can comprise: i) identifying (e.g., by a processor in operable communication with the PDN) CI nodes within the PDN; ii) ranking (e.g., by the processor) the CI nodes based on cost of power loss, with the CI node having the highest cost of power loss being ranked as a most important CI node; and iii) performing (e.g., by the processor) a multi-objective optimization to determine locations to place distributed energy resources (DERs) within the PDN, based on the ranking of the CI nodes, to boost the resiliency of the PDN. The method can further comprise placing the DERs within the PDN according to the locations determined by the multi-objective optimization. The ranking of the CI nodes can utilize: a first criterion of a social importance of the respective CI node; a second criterion of an apparent power rating of a power load of the respective CI node; and/or a third criterion of a proximity to a substation of the respective CI node. The ranking of the CI nodes can utilize an analytic hierarchy process (AHP) on the first criterion, the second criterion, and/or the third criterion, and/or can compare the first criterion, the second criterion, and the third criterion pairwise (e.g., using a semantic scale, such as the semantic scale of Saaty). After the AHP and pairwise comparison, the first criterion can have an assigned weight of, e.g., about 0.72 (or 0.724), the second criterion can have an assigned weight of, e.g., about 0.19 (or 0.193), and/or the third criterion can have an assigned weight of, e.g., about 0.08 (or 0.083). The multi-objective optimization can comprise utilizing a first objective function, a second objective function, and a third objection objective. The first objective function can maximize abase resilience of the PDN; the second objective function can optimize sizing and placement of the DERs; and/or the third objective function can minimize overall power loss of the PDN. The first objective function ($OF_1$), the second objective function ($OF_2$), and the third objective function ($OF_3$) can be as shown in Equations (5), (6), and (7), respectively, herein. The multi-objective optimization can comprise utilizing power flow constraints, capacitor banks reactive power and voltage regulator tap constraints, and/or a nodal voltage constraint. The multi-objective optimization can comprise using a sorting and multi-objective algorithm to generate an initial population of variables. The DERs can be, for example, photovoltaic (PV) cells.

BRIEF DESCRIPTION OF DRAWINGS

FIG. 12 shows a table of ranking of CI nodes.

FIG. 13 shows a table of POSs obtained for a test case.

DETAILED DESCRIPTION

Embodiments of the subject invention provide novel and advantageous systems and methods for boosting resiliency of a power distribution network (PDN). A distributed energy resource (DER) hosting process or algorithm can be used to boost network resiliency through the use of locally installed DER systems that can be operated, dispatched, and/or controlled as individual power plants. The process or algorithm can incorporate a unique critical infrastructure (CI) ranking scheme to prioritize CIs to be optimally located close to the DER while increasing the DER hosting capacity of the network. Simulation results gave Pareto Optimal Solutions (POSs) showing several options of optimally locating the DERs in order to achieve an optimal DER size, improve the power system's resiliency, and minimize losses while satisfying all network and power flow constraints (see Example 1). The effectiveness of the algorithmic formulation has been validated (see Example 1). Systems and methods of embodiments of the subject invention can be used by distribution planners and designers to apply directly to a multitude of network substations to improve the overall system's resiliency through grid-scale situation awareness.

The term extreme event can refer to a high-impact, low-frequency events such as natural disasters (e.g., tornadoes, hurricanes, earthquakes, wildfires), cyber-attacks, and human-physical activities. Also, the term resiliency, when referring to a distribution network, can refer to the distribution network's ability to provide continuous power supply to at least one of its CI nodes during the occurrence of an extreme event.

Because DERs are dispersed across a PDN, grid-tied DER systems can island to form a microgrid during an extreme event, consequently improving a PDN's resilience. Related art methods for the use of microgrids for resilience enhancement in PDNs focus on developing system reconfiguration algorithms to form microgrids during an extreme event. Optimal DER hosting and location for resilience enhancement is important, but these concepts are not considered in related art methods. Optimal DER hosting (sizing) and location of the DER can use power flow, voltage measurements, cable ampacity, thermal limits, and power quality as constraints. Embodiments of the subject invention can also consider resilience measurements as part of an optimization formulation.

Figure 1:
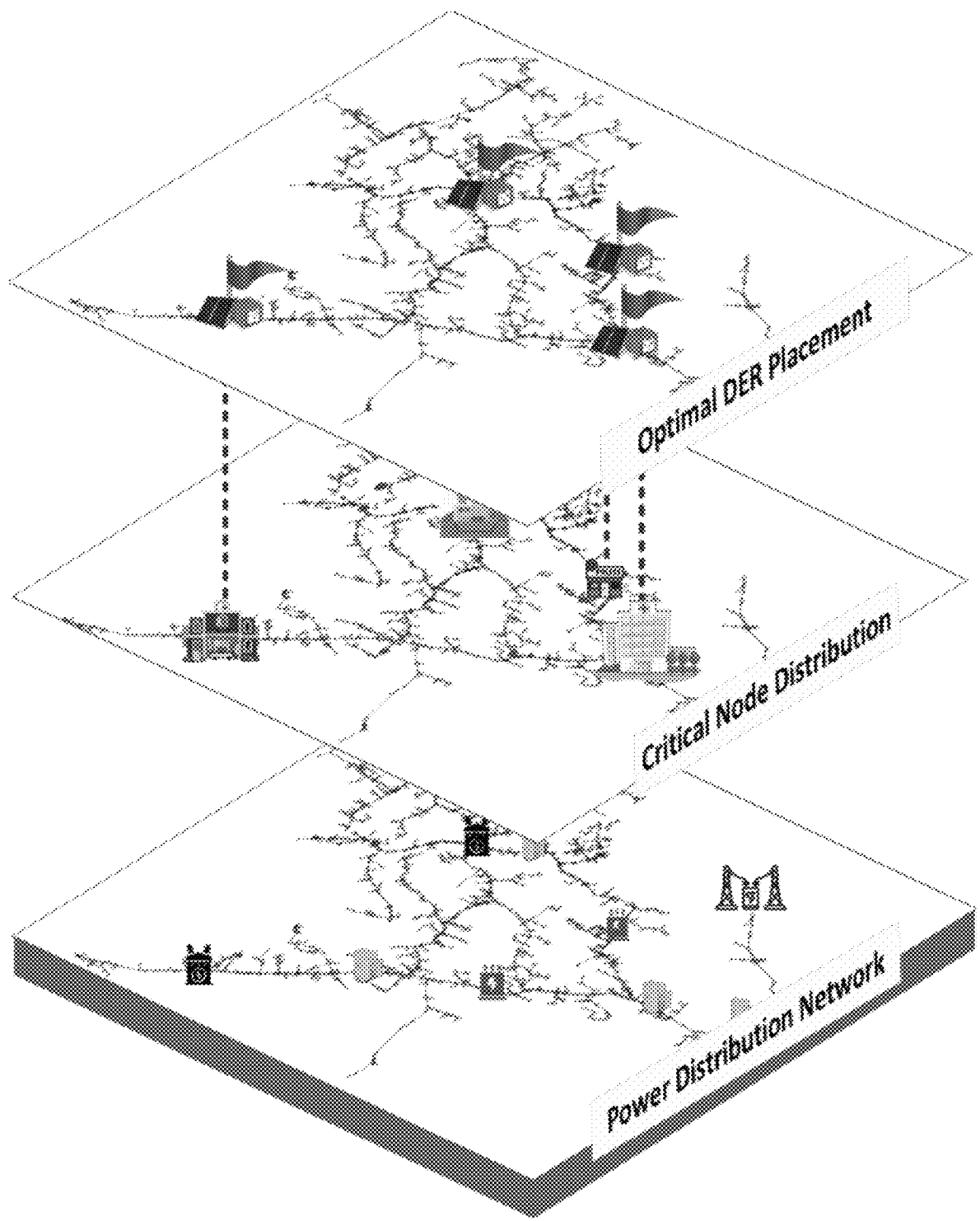
FIG. 1 shows a schematic view of resilience enhancement of a power distribution network through optimal distributed energy resource (DER) hosting prioritizing critical nodes, according to an embodiment of the subject invention.

During an extreme event it is important to prevent or inhibit loss of critical services such as medical services, fire rescue, and the like. Therefore, it is crucial to prioritize those CI nodes when enhancing a PDN's resiliency. Algorithms used with embodiments of the subject invention can prioritize CIs in a power system when hosting DERs. Contrary to the related art, embodiments of the subject invention provide a clear and consistent mathematically-formulated ranking scheme for CIs. Embodiments of the subject invention aim to significantly enhance the resiliency of a distribution network by installing DER systems strategically with respect to the network's CI nodes, such that these DER systems and their corresponding local control systems can be treated as individual power plants. This concept is illustrated in FIG. 1. Referring to FIG. 1, the lowest layer thereof shows the entire PDN prior to identifying the CIs. The CIs are identified and prioritized in the middle layer while the DERs are optimally sized (based on maximum DER hosting) and strategically located to enhance the PDN's resiliency in the upper layer.

Related art methods for resilience of PDNs mostly focus on either quantification of the resilience of the system or system reconfiguration and restoration algorithms for resilience enhancement. Among related art methods that even consider criticality of loads, none prioritize loads according to criticality (see, e.g.; Gao et al., "Resilience-oriented critical load restoration using microgrids in distribution systems," IEEE Transactions on Smart Grid, vol. 7, no. 6, pp. 2837-2848, 2016; and Poudel et al., "Critical load restoration using distributed energy resources for resilient power distribution system," IEEE Transactions on Power Systems, vol. 34, no. 1, pp. 52-63, 2019). Embodiments of the subject invention advantageously consider CI prioritization in resilience metric formulation.

Unlike related art methods and systems, embodiments of the subject invention considers optimal DER hosting with the objective of improving PDN resiliency by prioritizing the CIs of the power system. Some key features include: a unique ranking scheme to prioritize the continuity in power supply for the CIs in the network during an extreme event; a unique algorithmic formulation that leverages on the benefits hosting capacity of DERs and network reconfiguration to ensure continued power supply to the maximum possible number of CI nodes and forms a microgrid when necessary with minimum power losses during an extreme event; and application of probabilistic time series tools to emulate an extreme weather event to utilize and/or validate algorithms of systems and methods of embodiments of the subject invention.

A node within a grid whose loss or degradation poses a significant threat to the safety, health, environmental, economic, technological, or functional aspects of a society can be defined as a critical node. According to the U.S. Department of Homeland Security, these nodes belong to one of the 16 CIs that include, but are not limited to, energy, food and agriculture, emergency services, transportation systems, healthcare and public health, communications, government facilities, and water and wastewater systems (see also, N.P.P.D., "Critical infrastructure security and resilience month toolkit," U.S. Department of Homeland Security (DHS) Technical Report by the National Protection & Programs Directorate, November 2018, dhs.gov/sites/default/files/publications/CISR-month-toolkit-10292018-508.pdf, which is hereby incorporated herein by reference in its entirety). It is to be understood that this whole set of infrastructure does not have the same level of criticality when prioritizing the power continuity in the case of an extreme weather event.

During an extreme event it is required to power up the CIs that directly impact the safety of human life. The ranking of infrastructure criticality is heavily dependent on the particular system. Some utility networks may have one or several critical loads such as hospitals, fire stations, police stations, airports, and the like, while some may have none. Also, priorities change subjective to the extreme weather events frequent to that specific area. For example, hurricanes are the most common extreme weather event in Florida while it is wildfires in California. During a wildfire, the electricity supply to the residential buildings in the affected area is cut off (public safety power shutoffs) while it's the opposite for a hurricane. Unlike during a hurricane, transportation systems get a higher priority during a wildfire.

The approaches to identify and rank CI nodes involve risk assessment strategies that can be either qualitative or quantitative, and can be bounded by the CI protection (CIP) guidelines of the North American Electric Reliability Corporation (NERC) (see also, e.g.; Chalishazar et al., "Power system resilience metrics augmentation for critical load prioritization," 1 2021; osti.gov/biblio/1764623; Almeida, "A multi-criteria methodology for the identification and ranking of critical infrastructures," Instituto Superior Tecnico Report, pp. 1-10, 2011; Fekete, "Common criteria for the assessment of critical infrastructures," International Journal of Disaster Risk Science, vol. 2, no. 1, pp. 15-24, 2011; Barker et al., "Resilience-based network component importance measures," Reliability Engineering & System Safety, vol. 117, pp. 89-97, 2013; Pinnaka et al., "Modelling robustness of critical infrastructure networks," in 2015 11th International Conference on the Design of Reliable Communication Networks (DRCN). IEEE, 2015, pp. 95-98; Chopra et al., "Interconnectedness and interdependencies of critical infrastructures in the us economy: Implications for resilience," Physica A: Statistical Mechanics and its Applications, vol. 436, pp. 865-877, 2015; and Dauelsberg et al., "Modeling economic impacts to critical infrastructures in a system dynamics framework," in Proceedings of the 23rd International Conference of the System Dynamics Society, 2005, p. 63; all of which are hereby incorporated herein by reference in their entireties).

The cost of the power loss should be considered when ranking the CIs for power continuity. In many embodiments, three criteria can be considered that contribute to the cost of power loss. The first criterion is the social importance of the infrastructure, $R_i^{SI}$. Ranking based on the social importance is more of a cognatic decision and is specific to the particular event and to the system. The simplest example is a hospital load that is essential to power up during a hurricane. This is because the cost of human life is invaluable and evaluated at the highest cost. Losing power of a bigger load creates a bigger economic loss as well as a higher impact to the stability of the grid. Therefore, the second criterion is selected as the apparent power rating of the power load, $S_i^L$. During an extreme event the loads farthest away from the substation are more vulnerable as there is a higher chance they lose power due to damages to the incoming power line. Therefore, the proximity to the substation, $D_i$ is selected as the third criterion for CI ranking.

As multiple criteria are involved in decision making, an analytic hierarchy process (AHP) is applied and the criteria can be compared pairwise (e.g., using a semantic scale, such as the semantic scale of Saaty). An inconsistency of 10% can be used for tolerance for the pairwise comparison, and the relative importance of criteria can be obtained as, e.g., 0.724, 0.193, and 0.083 for $R_i^S$, $S_i^L$, and $D_i$, respectively. Assuming $N_{CI}$ as the set of all CIs, $\forall_i \in N_{CI}$, $R_i^{SI}$ is the normalized social importance ranking of each CI, $S_i^L$ is the normalized apparent power rating of each CI, and $D_i$ is the normalized distance from each CI and the substation transformer. These can be expressed as Equation (1), Equation (2), and Equation (3), respectively.

$$R_{N,i}^{SI} = \frac{2}{|N_{CI}|}\left(1 - \frac{R_i^{SI}}{|N_{CI}|+1}\right) \quad (1)$$

$$S_{N,i}^{L} = \frac{S_i^L}{\sum_{i \in N_{CI}} S_i^L} \quad (2)$$

$$D_{N,i} = \frac{D_i}{\sum_{i \in N_{CI}} D_i} \quad (3)$$

Then, the net score (weight) for each node $i \in N_{CI}$ can expressed as in Equation (4).

$$\omega_i = 0.724 \cdot R_{N,i}^{SI} + 0.193 \cdot S_{N,i}^{L} + 0.083 \cdot D_{N,i} \quad (4)$$

A set of weights $\omega_i$ can be developed for the given network. The weights of CI nodes can be arranged in descending order such that the node with the highest weight gets a rank of 1 (most critical), and the node with the least weight gets a rank of $|N_{CI}|$ (least critical) where $|N_{CI}|$ is the cardinality of $N_{CI}$.

Figure 2:
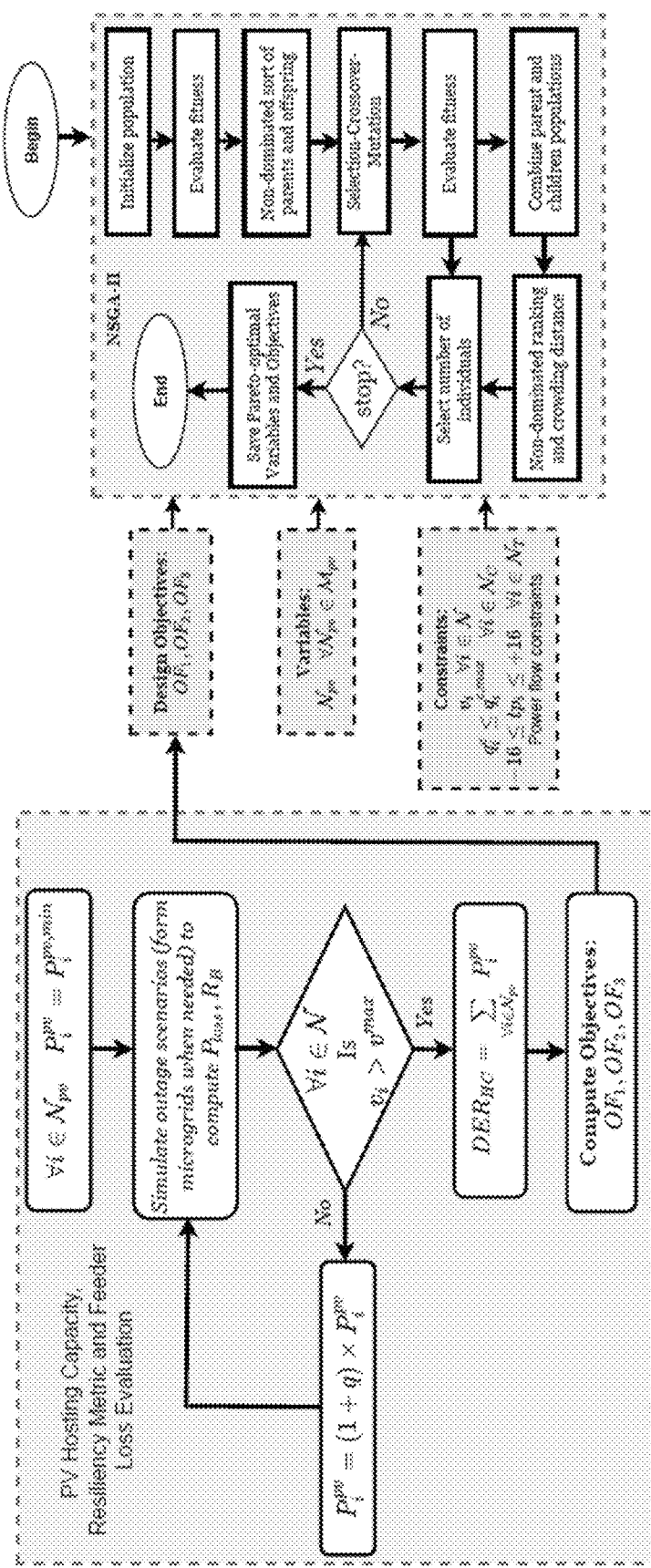
FIG. 2 shows a flowchart of an optimal DER location and hosting algorithm for resilience enhancement, according to an embodiment of the subject invention.

FIG. 2 shows a flowchart of an optimal DER location and hosting algorithm for resilience enhancement, according to an embodiment of the subject invention. The DER can be, for example, a photovoltaic (PV) system, though embodiments are not limited thereto. The algorithm can be developed as a multi-objective optimization problem in which three objectives are considered. The three objective functions for the optimization problem can be: 1) maximizing the resilience; 2) the optimal sizing and placement of DERs; and 3) minimizing the overall power loss. In order to measure the level of resilience, the resiliency metric used can be expressed as in Equation (5).

$$OF_1 := \max|R_B| = \max\left|\frac{\sum_{i=1}^{N_{CI}} \omega^{(i)} T_{U,i}}{\sum_{i=1}^{N_{CI}} (T_{U,i} + T_{D,i})}\right| \quad (5)$$

where $T_{U,i}$ is the up time of the CI on node i, $T_{D,i}$ is the down time of CI on node i, $OF_1$ is objective function 1, and $R_B$ is the base resilience.

In order to maximize the DER hosting capacity of the network, the second objective function ($OF_2$) of the optimization problem can be expressed as in Equation (6).

$$OF_2 := \max|DER_{HC}| = \max\left|\sum_{i \in N_{pv}} P_i^{pv}\right| \quad (6)$$

where $N_{pv}$ is the set containing all the PV systems used as DER in the network and $P_f^{pv}$ is the kilowatt (kW) rating based on DER hosing capacity of the PV at node i. This equation can be genericized for DERs that are not PVs by substituting the type of DER for PV system where applicable.

The third objective function ($OF_3$) of the problem formulation, minimizing the average hourly power loss, can be expressed in Equation (7).

$$OF_3 := \min\left|\frac{1}{T}\sum_{t=1}^{T} P_{loss}^t\right| \quad (7)$$

where $$P_{loss} = \sum_{(i,j) \in L} r_{ij} \times \frac{P_{ij}^2 + Q_{ij}^2}{v_i}$$

where L is the set of all branches in the network, $\forall ij \in L$, $P_{ij}$ and $Q_{ij}$ are the active and reactive power flow, respectively, from node i to j, $r_{ij}$ is the resistance between branch ij, $v_i$ is the nodal voltage at node i, t is time, and T is the total time.

The optimization constraints include: the power flow constraints, for example as expressed in Equations (8) and (9); the capacitor banks reactive power and voltage regulator tap constraints, for example as expressed in Equations (10) and (11); and the nodal voltage constraint, for example as expressed in Equation (12).

$$P_i^G = P_i^L + v_i^d \sum_{k=1}^{n}(G_{ik}v_k^d - B_{ik}v_k^q) + v_i^q \sum_{k=1}^{n}(B_{ik}v_k^d + G_{ik}v_k^q) \forall\, i \in N \quad (8)$$

$$Q_i^G = Q_i^L + v_i^d \sum_{k=1}^{n}(-B_{ik}v_k^d - G_{ik}v_k^q) + v_i^q \sum_{k=1}^{n}(G_{ik}v_k^d - B_{ik}v_k^q) \forall\, i \in N \quad (9)$$

$$q_i^c \leq q_i^{c,max} \forall i \in N_C \quad (10)$$

$$-16 \leq tp_i \leq +16 \forall i \in N_T \quad (11)$$

$$v^{max} \geq |v_i| \geq v^{min} \quad (12)$$

where N is the set containing all the nodes in the network, $N_C$ is the set containing all the capacitor banks, $N_T$ is the set of nodes with voltage regulators/load tap changers, $\forall i \in N$; $P_i^L + jQ_i^L$ is the active and reactive load at bus i, $v_i = v_i^d + jv_i^q$ is the complex voltage phasor, $Y = G + jB$ is the network admittance matrix, $q_i^c$ and $q_i^{c,max}$ are the reactive and maximum reactive power injection, respectively, by the capacitor banks at node i, $tp_i$ is the voltage regulator/load tap changer tap position at node i, and $v^{max}$ and $v^{min}$ are the maximum and minimum nodal voltage, respectively, which can usually be set at 1.05 per unit (pu) and 0.95 pu, respectively.

The algorithm can start by using a sorting and multi-objective algorithm (e.g., a fast sorting and elite multi objective genetic algorithm such as NSGA-II) to generate the initial population of variables, which is the set of nodes $N_{pv}$ from the candidate set of nodes $M_{pv}$ (which are all three phase nodes in the network). These are used to evaluate the fitness of the objective functions ($OF_1$, $OF_2$, and $OF_3$ as expressed in Equation (5), Equation (6), and Equation (7), respectively). The DER considered can be, for example, a PV system, though embodiments are not limited thereto. If the DER is a PV system, then in order to obtain the PV hosting capacity, the $R_B$, and the average hourly power loss, based in the $N_{pv}$, the algorithm can start by setting the PV kW rating to a minimum set value of $P_f^{pv,min}$.

An outage scenario can be simulated, and the power loss and resilience metric can be calculated for that particular scenario. Then, the system nodes can be checked for any voltage constraint violations and if the voltage stays within the limits the power level of each PV can be increased by a factor q for the next PV hosting capacity iteration. The kW rating of the PVs can be increased and the outage scenarios simulated until the first nodal voltage violation occurs. The values of $OF_1$, $OF_2$, and $OF_3$ can be computed while the sorting and multi-objective algorithm (e.g., NSGA-II) generates the new set of off-springs and the process is continued until a stop criteria is met and the Pareto Optimal Solutions (POSs) are saved. Of course, the algorithm can also be used in a real-world setting and not just a simulation. The process can work the same, just without the outage scenario being simulated.

Embodiments of the subject invention provide systems and method that can utilize an optimal DER hosting algorithm to enhance the resilience of a PDN. The resilience of a PDN can be measured in the perspective of critical loads. Thus, critical loads can be prioritized according to a unique ranking scheme. The problem can be formulated as a multi-objective optimization where a sorting and multi-objective algorithm (e.g., NSGA-II) can be applied to obtain Pareto optimal solutions for the three objectives: enhance resilience; maximize DER (e.g., PV) sizing; and minimize power losses.

The algorithm was validated in a simulated environment in which a hurricane was emulated for two days applying probabilistic tools (see Example 1). The simulation results provided several options for DER placement, which have different trade-offs between the three objectives. The three dominant POSs were further analyzed for their impact on PDN. The critical load ranking scheme can provide the required level of load prioritization (e.g., a hospital load can be ranked one and a water pumping station with the highest power consumption can be ranked two). The resilience of the PDN can be enhanced by the DER placement (in Example 1, resilience of 0.51 $R_B$ to 0.94 $R_B$ was obtained for the best performing POSs.

In some embodiments: appropriate smart inverter functionalities of DERs can be incorporated to enhance the resiliency of a PDN; the ranking scheme can dynamically change while event progress; the power transfer from neighboring DERs can be considered through system reconfiguration strategies when constructing this optimization problem; the cost factor of DER installation can be incorporated in the objective function; and/or the impact of two weather events can be combined simultaneously when emulating the extreme weather (e.g., during a hurricane both the wind and the flooding affects the infrastructure).

Embodiments of the subject invention provide a focused technical solution to the focused technical problem of how to boost resiliency of a PDN. Embodiments of the subject invention improve the PDN and/or power system itself by increasing its resiliency in the case of extreme events.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

Figure 3:
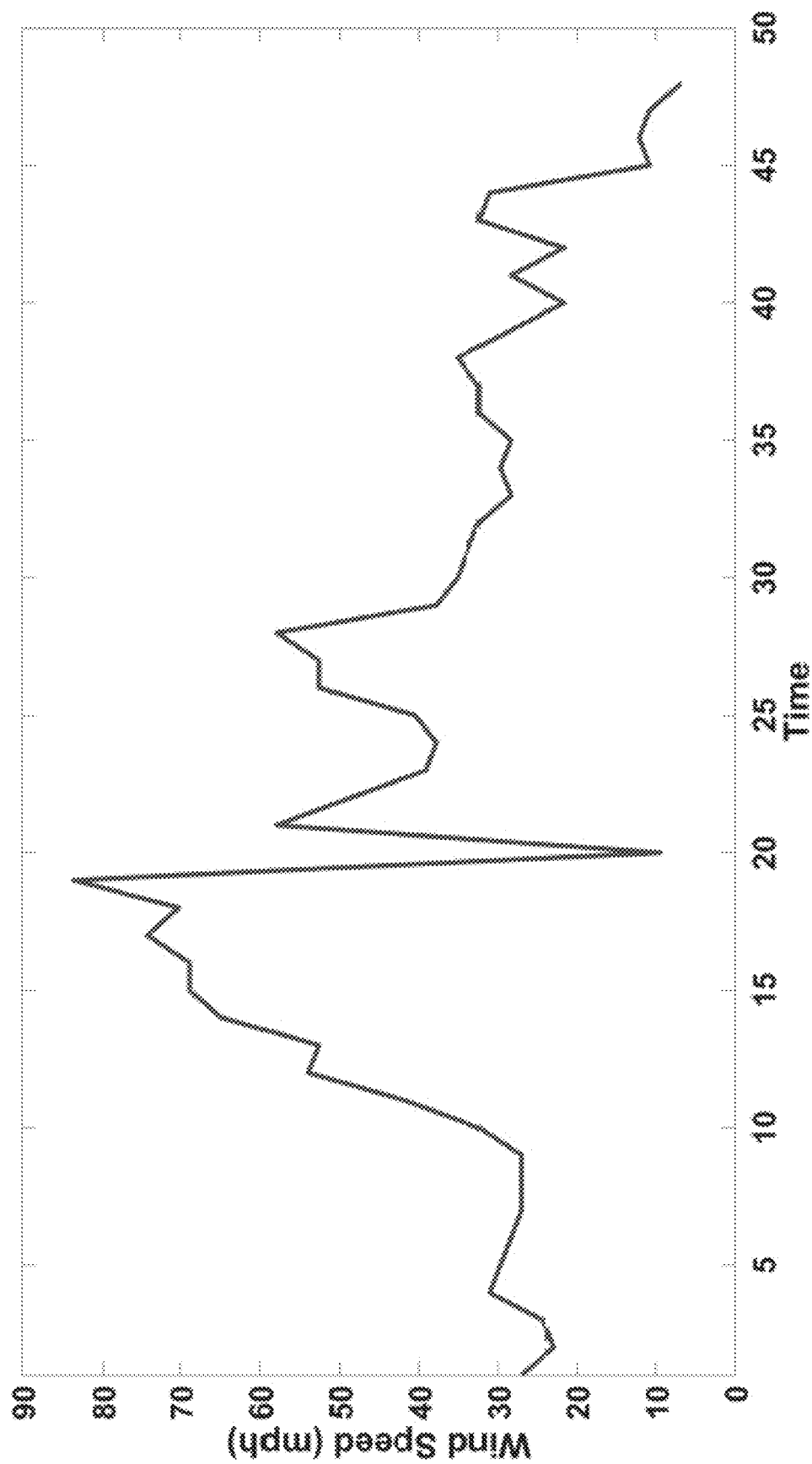
FIG. 3 shows a plot of wind speed (in miles per hour (mph) versus time, showing a wind profile of Hurricane Irma at Fort Myers, Fla. on Sep. 10, 2017 and Sep. 11, 2017.

When performing a resiliency determination simulation, it is important to simulate the extreme weather event over the PDN. In order to emulate the failure bunching phenomenon due to extreme weather, a sequential Monte-Carlo-based probabilistic tool can be used (see also, e.g.; Panteli et al., "Influence of extreme weather and climate change on the resilience of power systems: Impacts and possible mitigation strategies," Electric Power Systems Research, vol. 127, pp. 259-270, 2015. sciencedirect.com/science/article/pii/S037877961500187X; and Trakas et al., "Power systems resilience assessment: Hardening and smart operational enhancement strategies," Proceedings of the IEEE, vol. 105, no. 7, pp. 1202-1213, July 2017; both of which are hereby incorporated herein by reference in their entireties). A probability distribution of a wind profile and weather dependent fragility curves of the components can be used to replicate the stochastic power system failure events across space and time during a hurricane. In the simulation, a fragility curve for power lines was used (see also, e.g.; Dubey et al., "Risk-based probabilistic quantification of power distribution system operational resilience," IEEE Systems Journal, vol. 14, no. 3, pp. 3506-3517, 2020; which is hereby incorporated herein by reference in its entirety). A wind profile of Hurricane Irma for the Fort Myers area in Florida was used for the analysis. The total simulation was done for a 48-hour time period starting at 12 AM on Sep. 10, 2017 with a 1-hour time resolution as shown in FIG. 3. The wind speed was assumed to be constant during the one hour period. The probability of failure of lines during the event was not only dependent on the wind intensity but also on the age and wear of each of the lines. Therefore, in order to provide this randomness in failure, the failure probability of line k, $P_c^k(\omega)$ was compared with a uniformly distributed random number, r, at every simulation step. If $P_c^k(\omega) > r$ then the line k will trip and otherwise the line will continue to operate. This method was implemented to provide different deterioration levels for different lines.

In the considered test case, the windstorm progressed, reaching almost category-1 winds for that area. It was assumed that the damage assessments and line restorations began as soon as the disastrous winds were over. The mean time for damage assessment and line restoration process was assumed as 12 hours and again this time was randomized for different lines by multiplying by a random number (see also, e.g.; Kyriakides et al., "Metrics and quantification of operationaland infrastructure resilience in power systems," IEEE Transactions on Power Systems, vol. 32, no. 6, pp. 4732-4742, 2017; which is hereby incorporated herein by reference in its entirety). The obtained line failures were simulated at each simulation step and necessary measurements were obtained by performing the power flow analysis.

Figure 4:
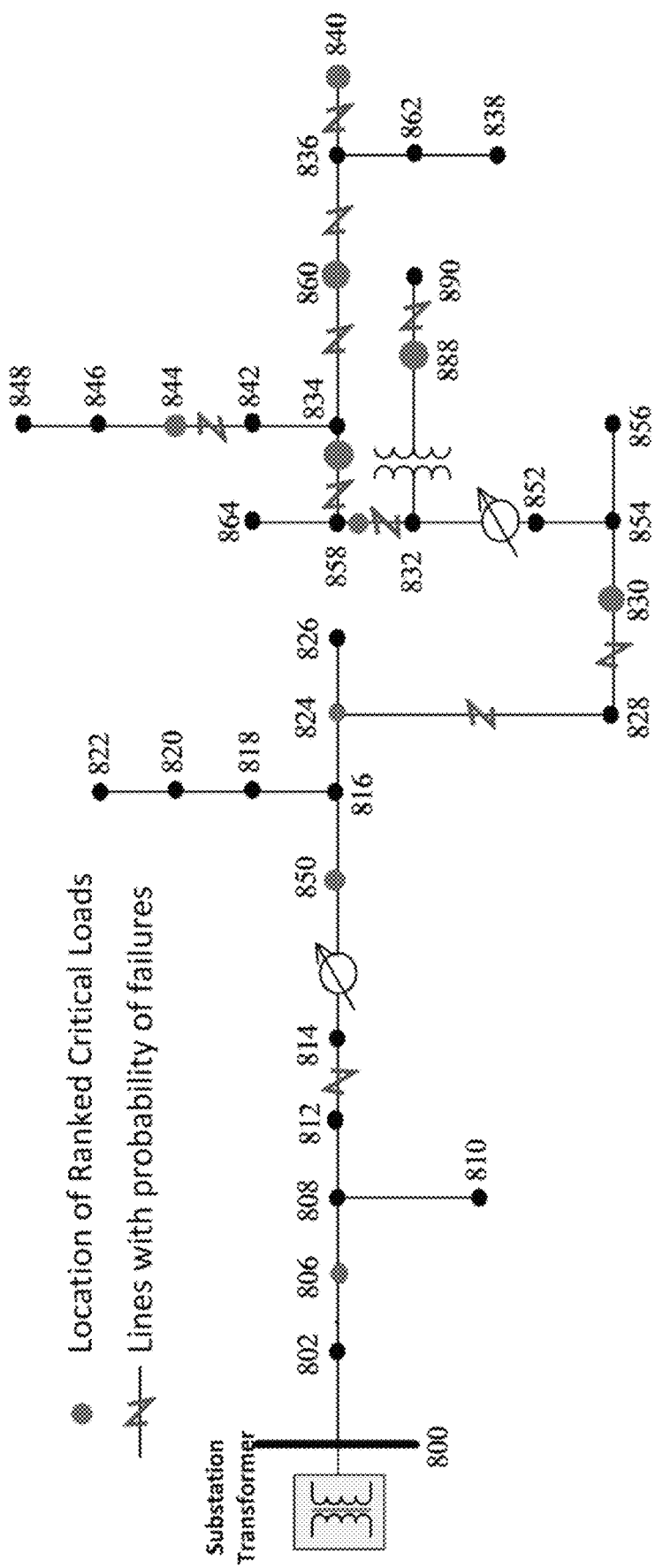
FIG. 4 shows a schematic view of an Institute of Electrical and Electronics Engineers (IEEE) 34 bus network with critical infrastructure (CI) nodes and lines with probability of failure marked on it. The circles denote locations of ranked critical loads, and the zigzags denote lines with probability of failures.

In order to validate the effectiveness of the DER hosting and optimal placement algorithm (of systems and methods of embodiments of the subject invention) for resiliency improvement, the IEEE 34 was modeled in the OpenDSS platform as a PDN as shown in FIG. 4. Five PVs were modeled as DERs and integrated into the PDN for the algorithm. The global horizontal irradiance (GHI) profile and temperature (both ambient as well as module temperature) for the PV systems were collected from an actual 1.4 megawatt (MW) PV system located on the Engineering campus of Florida International University in Miami, Fla. Because the PVs were assumed to be utility scale PVs, all the 3-phase nodes were selected as candidate nodes, which means $M_{pv}$=25 from which the optimal five locations for the PVs Np, were selected.

The nominal voltage rating of the feeder was 24.9 kilovolts (kV). The feeder had two voltage regulators between nodes 814 and 850 and between nodes 852 and 832. The substation transformer upstream of node 850 was a 2.5 MV A, 69/24.9 kV, $\Delta Y$. The combined rating of the load (modified) on the feeder was approximately 3.1 MW (active) and 0.689 MVAr (reactive). Node 838 was the farthest distance and it was approximately 59 kilometers (km) away from the substation transformer.

The IEEE feeder contained 31 loads, and 10 of those were chosen as CI nodes for the simulation. Ten three-phase loads that were distributed across the network were randomly selected as the CI nodes as shown in FIG. 4. The chosen CIs were ranked according to the load prioritization scheme of embodiments of the subject invention and is illustrated in the table shown in FIG. 12. $RES_1$ and $RES_2$ are residential loads on node mid858 and node 850, respectively; HOS is a hospital load on node mid834; FR is fire rescue on node 860; CH is city hall on node 840; SM is a shopping mall on node 844; $SUP_1$ and $SUP_2$ are supermarket loads on node 824 and node 806 respectively; WPS is the water pump station on node 888; and POL is the police station on node 830.

Example 1

Simulations were carried out in Matlab platform COM interfacing with OpenDSS. The generated Pareto optimal solutions (POSs) for the considered test case are shown in the table in FIG. 13, which shows the optimal DER placement combinations and their performance for each of the three objectives ($OF_1$, $OF_2$, and $OF_3$).

Figure 5:
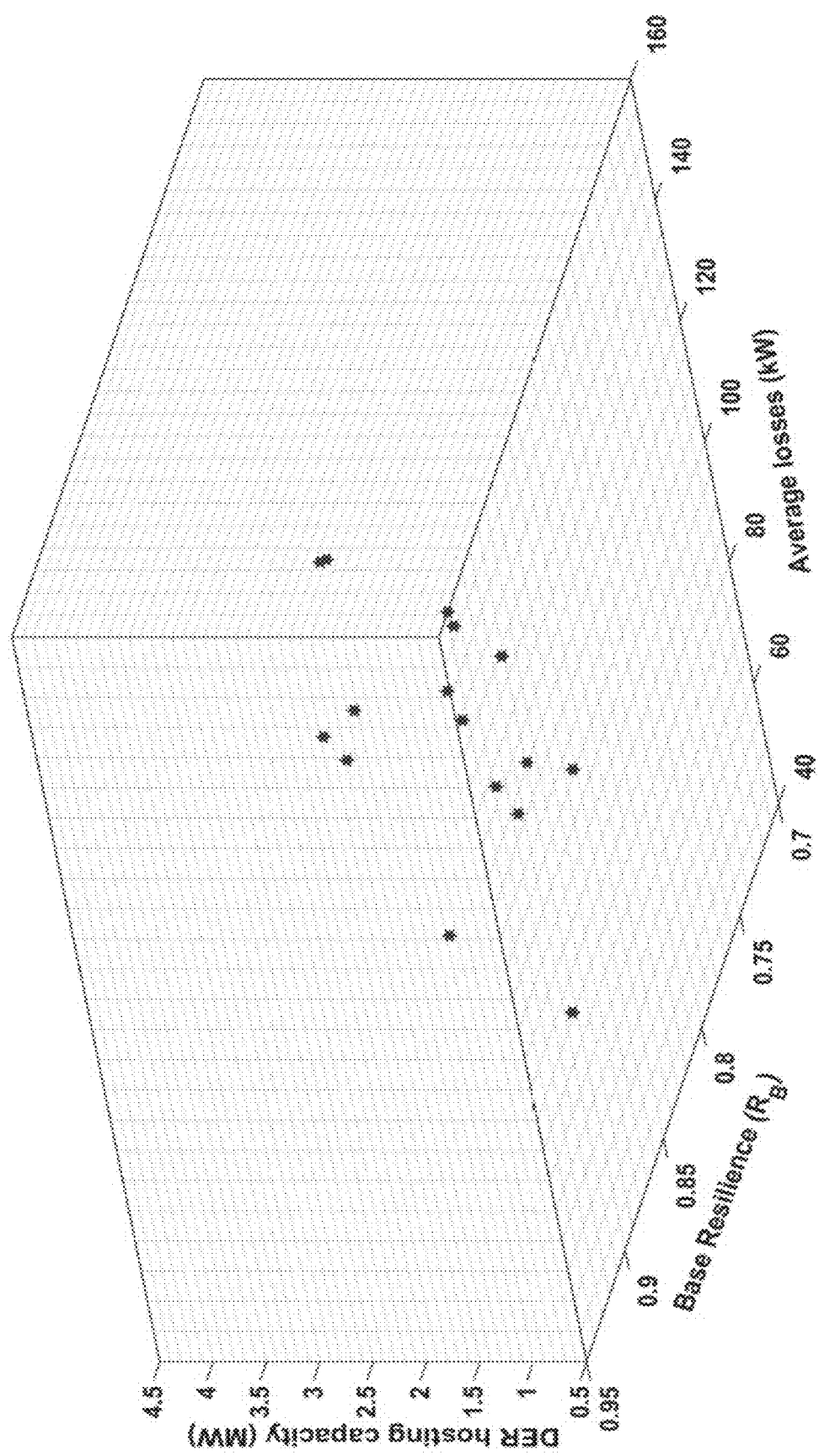
FIG. 5 shows a Pareto front with dominated solutions highlighted for further analysis. The axes are DER hosting capacity (in megawatts (MW)), base resilience ($R_B$), and average losses (in kilowatts (kW)).

Referring to FIG. 13, the best-performed POS for each of the three objectives were selected as the dominant solutions, and they are highlighted in the table of FIG. 13. POS-2 indicates the highest resilience with 0.94 for the $R_B$, and POS-5 has the least power loss while POS-12 provides the highest DER hosting capacity. The relevant node set among these three can be selected as per the requirement whether it is to enhance the resilience, maximize the size of DER, or minimize the loss. However, rather than focusing only on maximizing a single objective, it is possible to select a POS in the middle ground according to the requirements of the system. The Pareto optimal frontier comparison chart of the three objectives is shown in FIG. 5, which illustrates how each of the POSs is distributed in the three dimensions of objectives.

Figure 6:
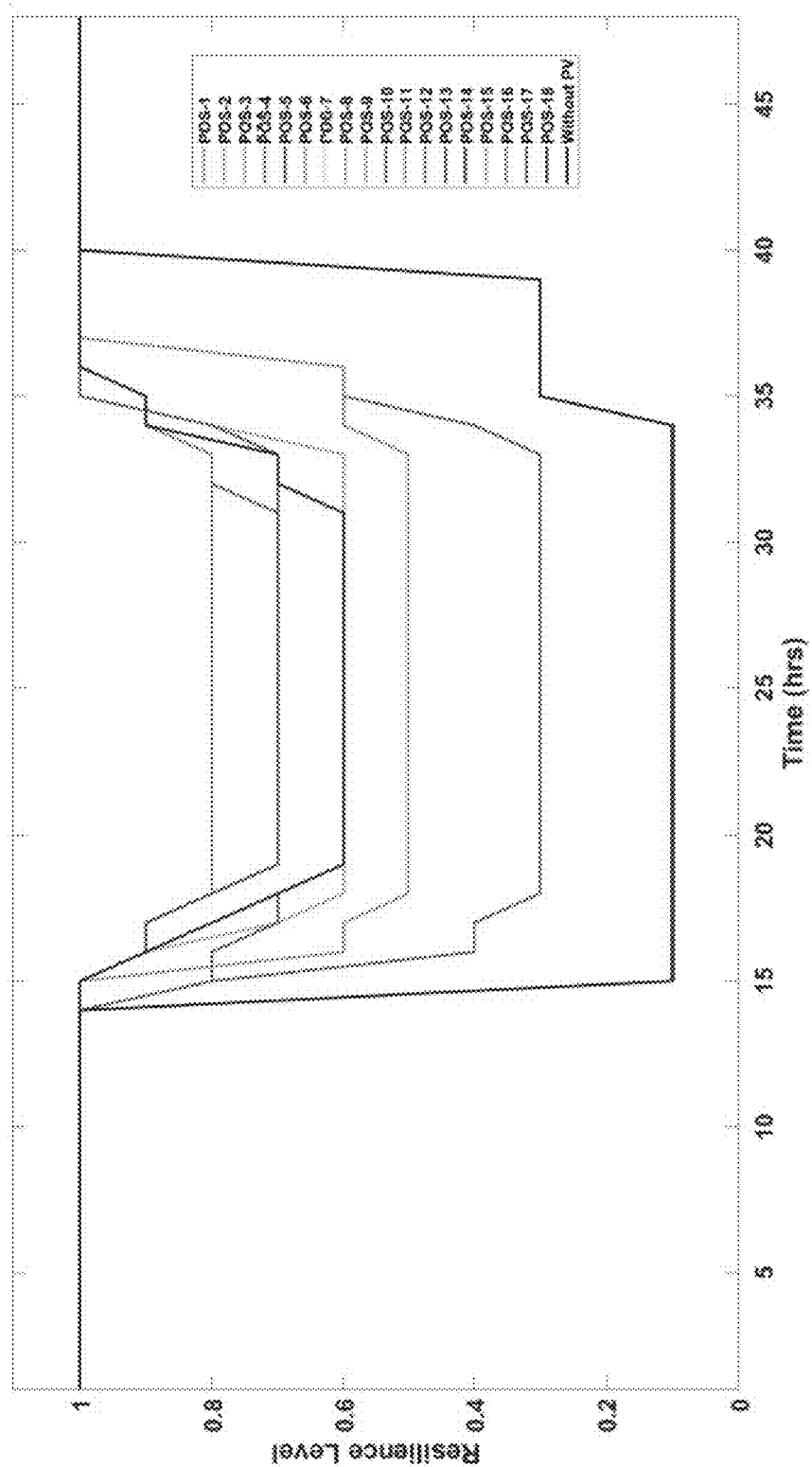
FIG. 6 shows a plot of resilience versus time (in hours (hr)), showing resilience trapezoids for different Pareto optimal solutions (POSs). At a time of 25 hours, the curves with the lowest to highest resilience values (with some unmentioned POSs overlapping those that are mentioned) are "before photovoltaic (PV)" placement, POS-14, POS-15, POS-18, POS-17, and POS-16, respectively.

FIG. 6 shows the resilience trapezoids of the PV placements for each of the POSs in contrast to the resilience trapezoid of before PV placement. The percentage availabilities of CIs are indicated as the level of resilience. Typically, the resilience trapezoid provides information on the level of resilience degradation, the rate of system degradation, rate of restoration, and the outage time. Referring to FIG. 6, it can be seen that POS-12 has a steep resilience degradation, a long outage time and 0.3 as the lowest resilience level. The lowest resilience POS-2 dropped to is 0.8 and its area of the trapezoid is small. Therefore, POS-12 and POS-2 generate the lowest and highest $R_B$ values, respectively, which are 0.72 and 0.94, respectively. It can also be seen that the lowest resilience performance is before PV placement, which has the lowest resilience level at 0.1; in this scenario the $R_B$ value is 0.51.

Figure 7A:
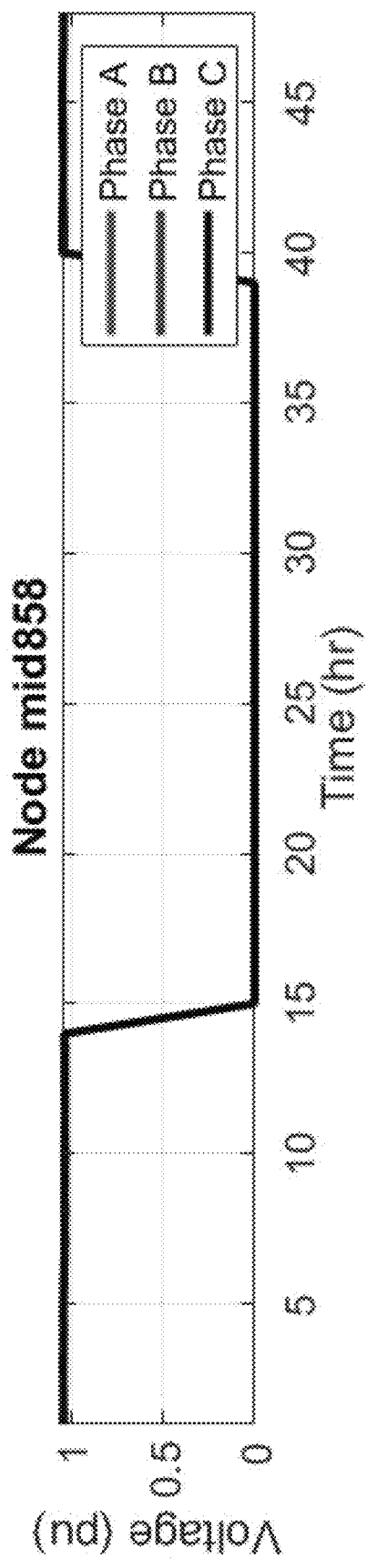
FIGS. 7A-7J show plots of voltage (per unit (pu)) versus time (in hr), showing voltage performance before PV placement at CI nodes mid858, mid834, 860, 840, 844, 824, 888, 830, 850, and 806, respectively (FIG. 7A shows node mid858, FIG. 7B shows node mid834, etc.), for Phase A, Phase B, and Phase C.
Figure 7B:
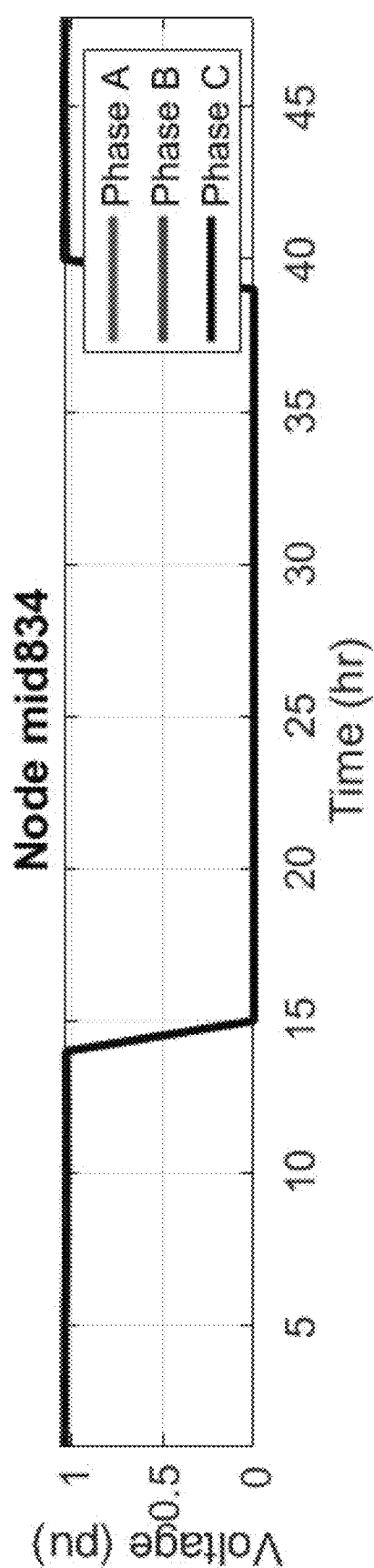
Figure 7C:
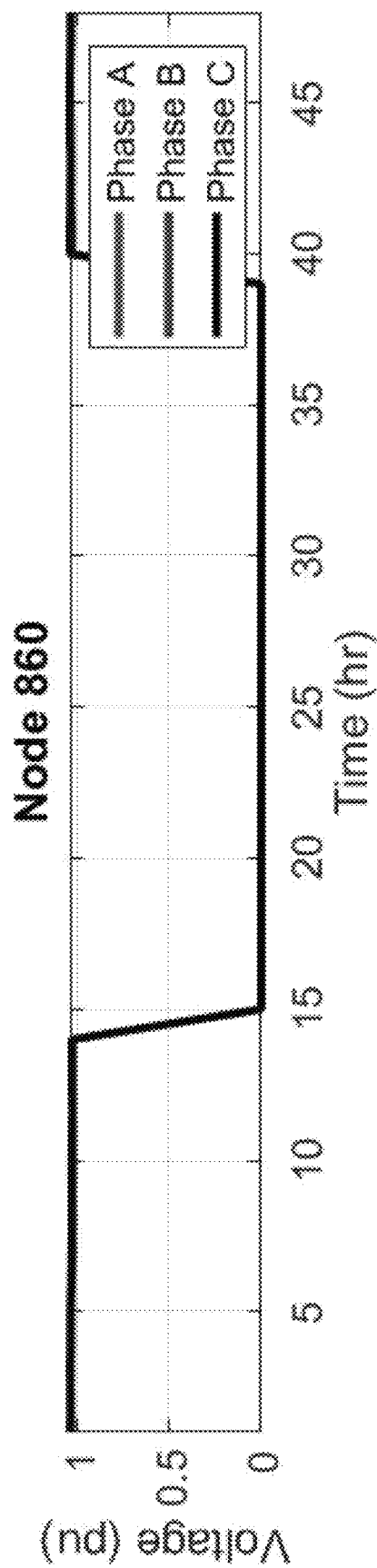
Figure 7D:
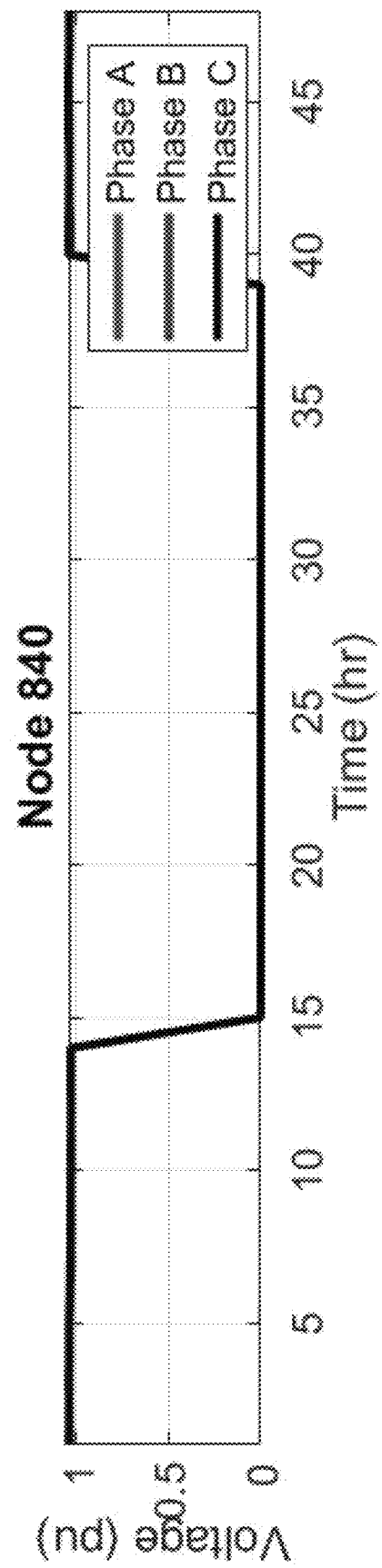
Figure 7E:
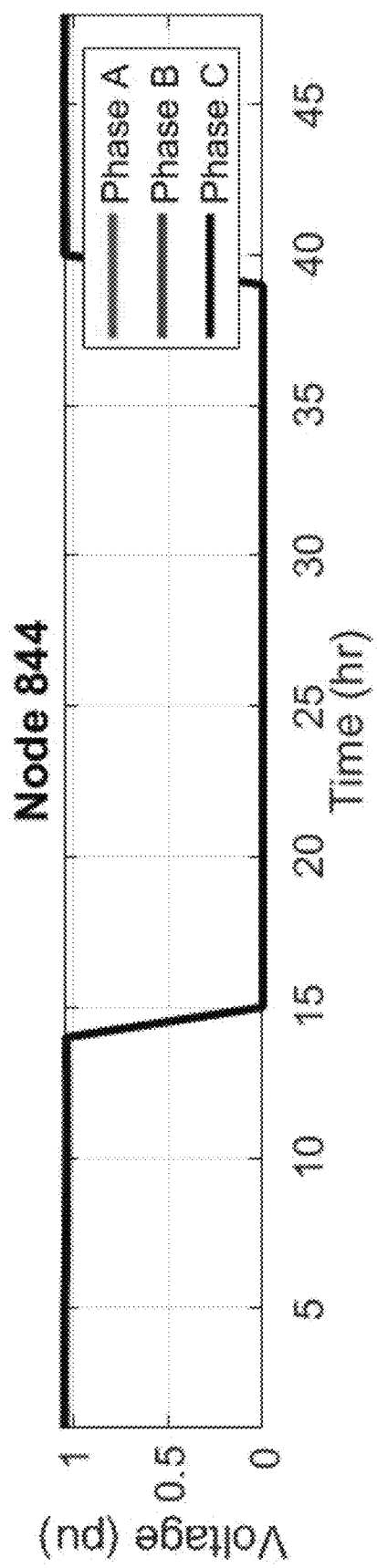
Figure 7F:
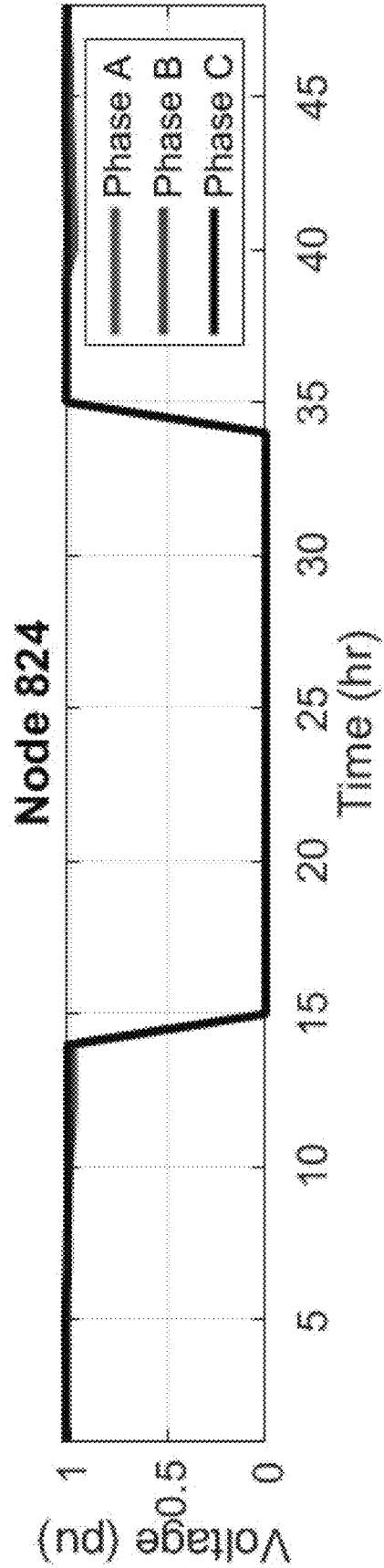
Figure 7G:
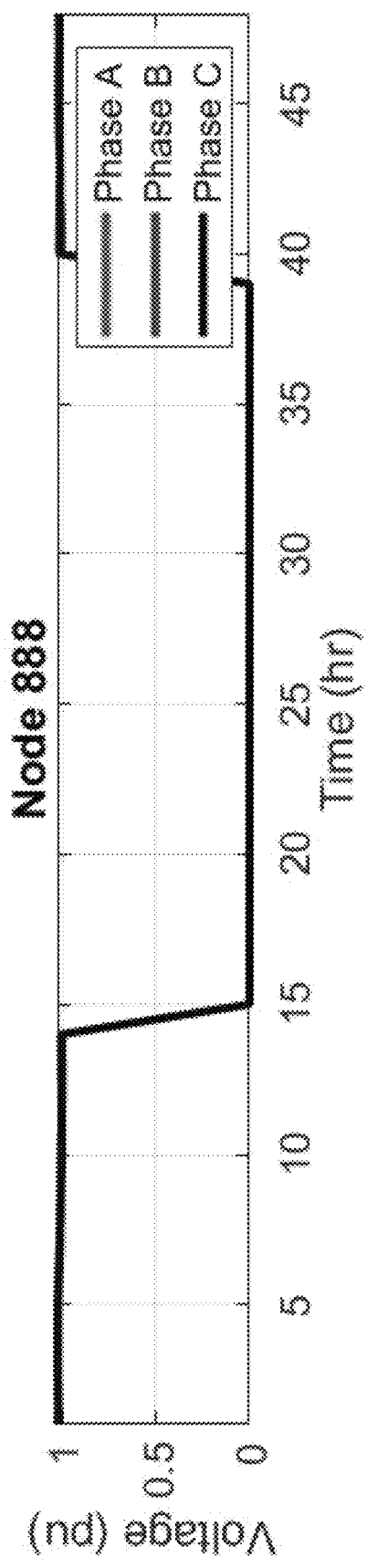
Figure 7H:
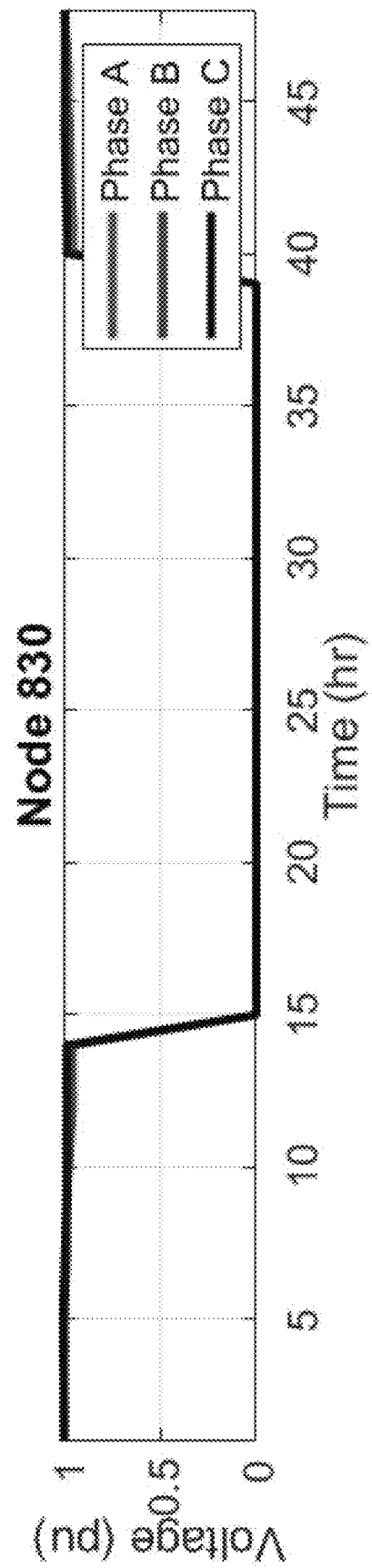
Figure 7I:
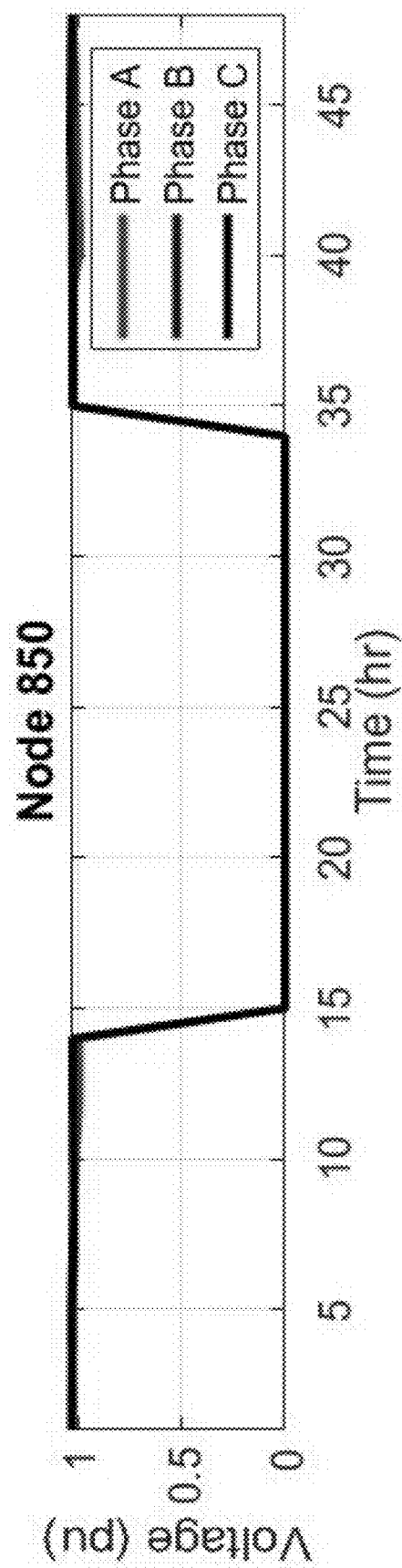
Figure 7J:
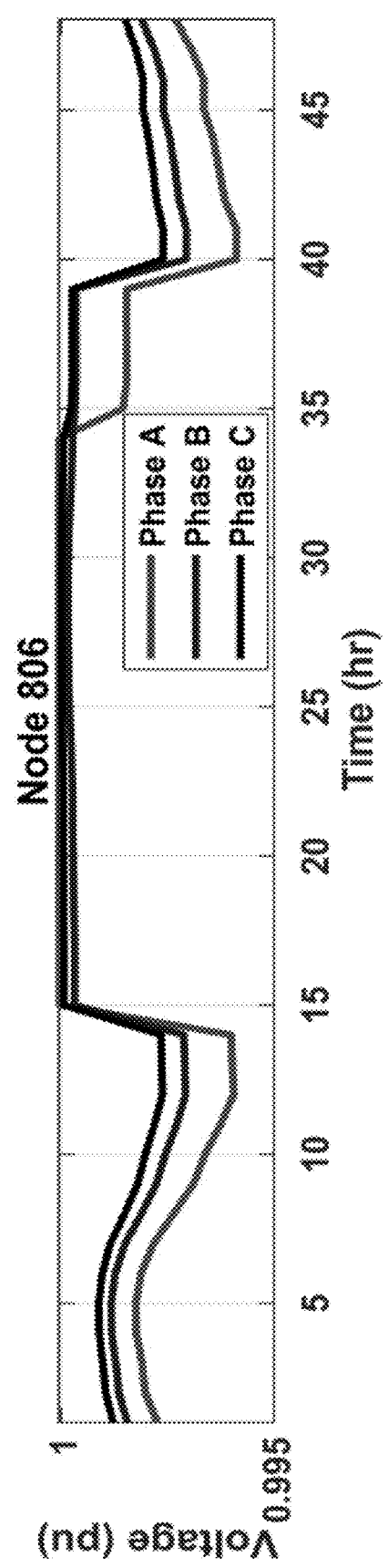
Figure 8A:
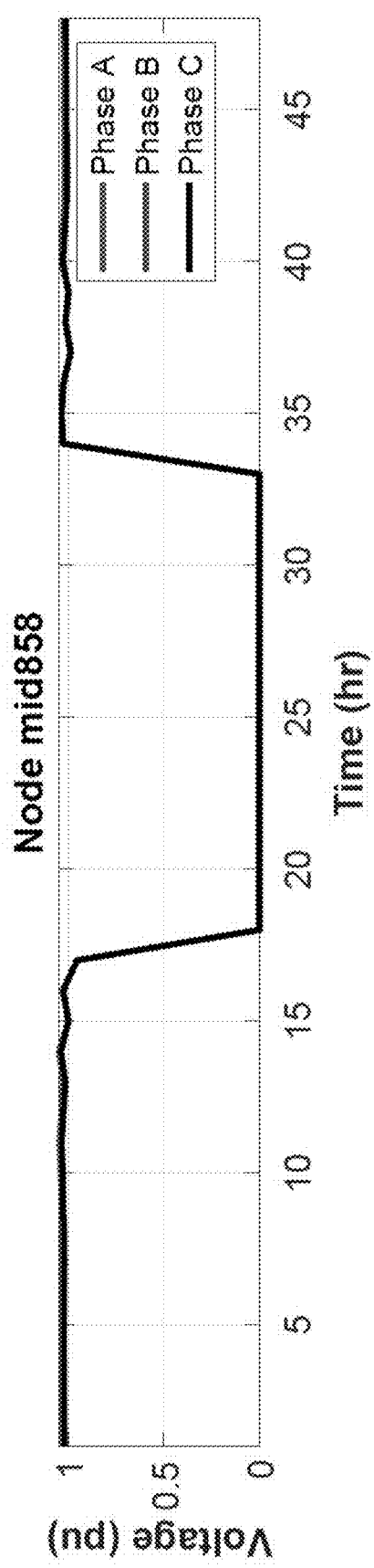
FIGS. 8A-8J show plots of voltage (pu) versus time (in hr), showing voltage performance for POS-2 at CI nodes mid858, mid834, 860, 840, 844, 824, 888, 830, 850, and 806, respectively (FIG. 8A shows node mid858, FIG. 8B shows node mid834, etc.), for Phase A, Phase B, and Phase C.
Figure 8B:
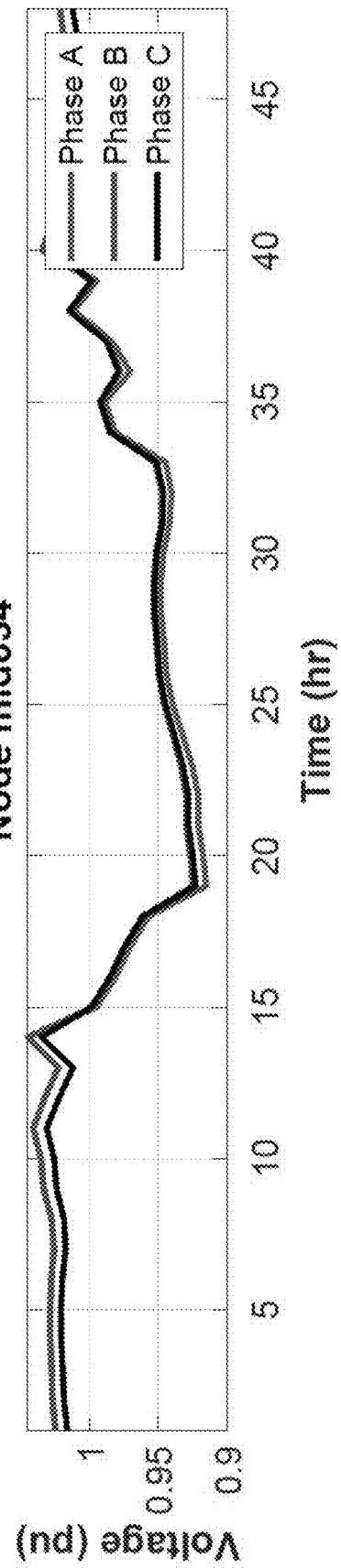
Figure 8C:
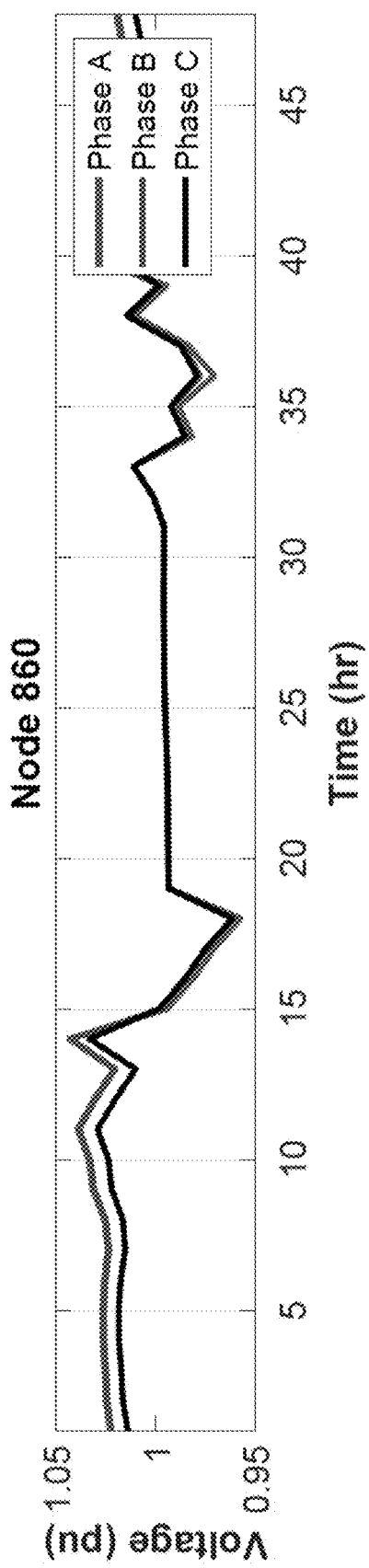
Figure 8D:
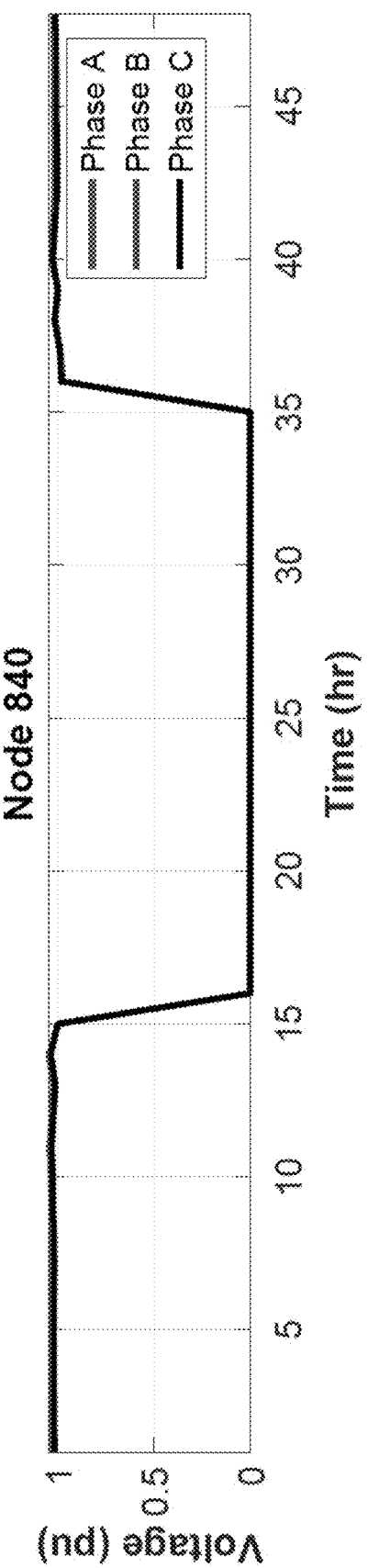
Figure 8E:
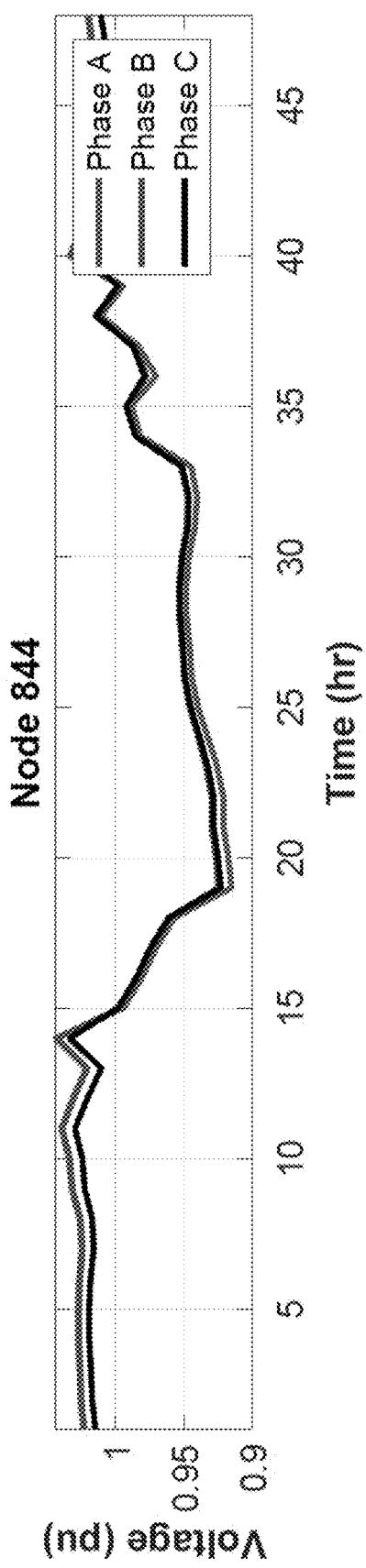
Figure 8F:
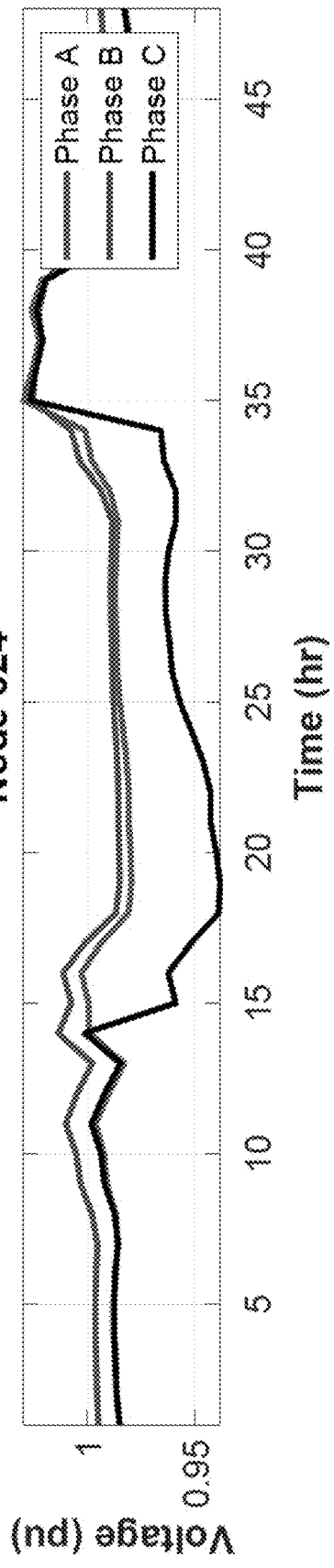
Figure 8G:
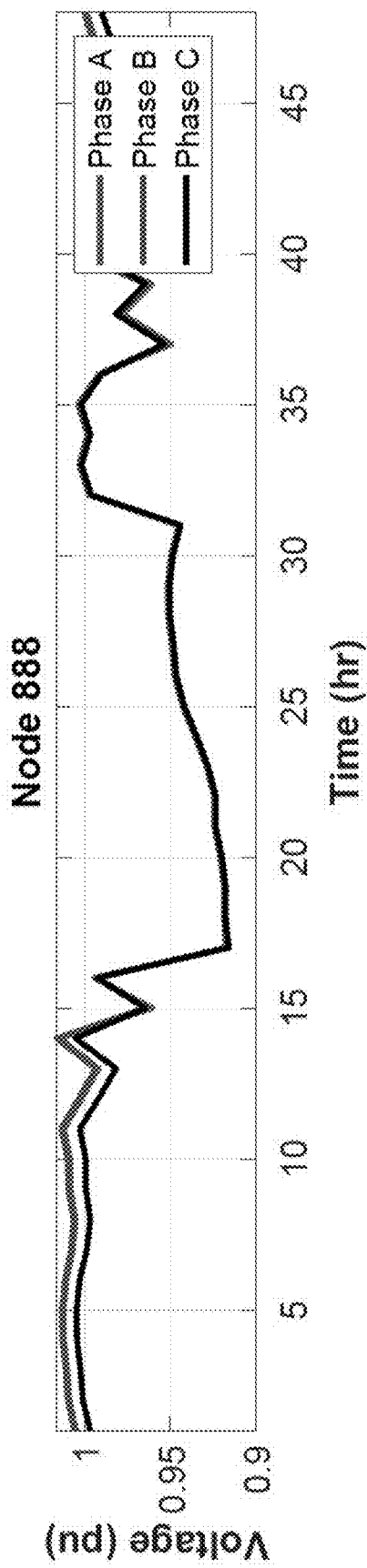
Figure 8H:
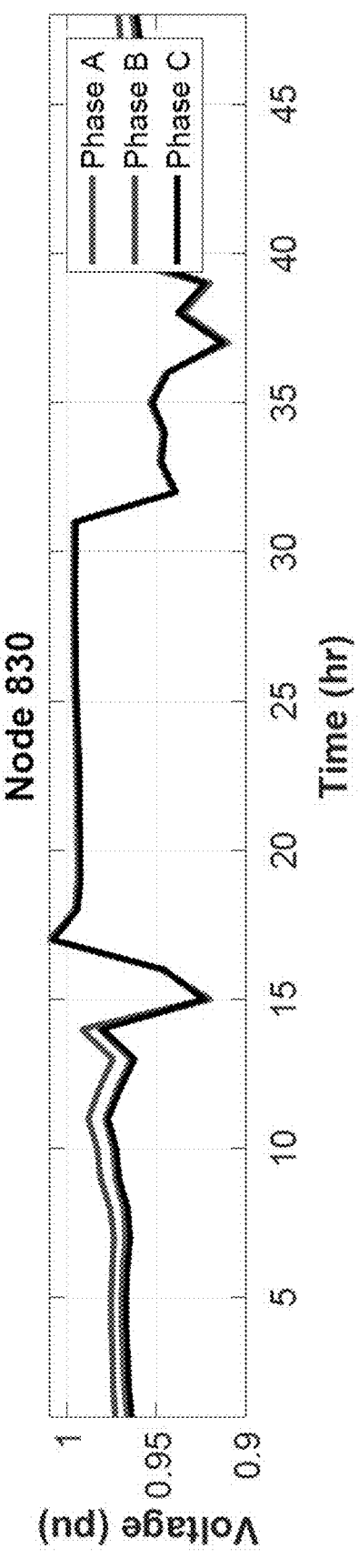
Figure 8I:
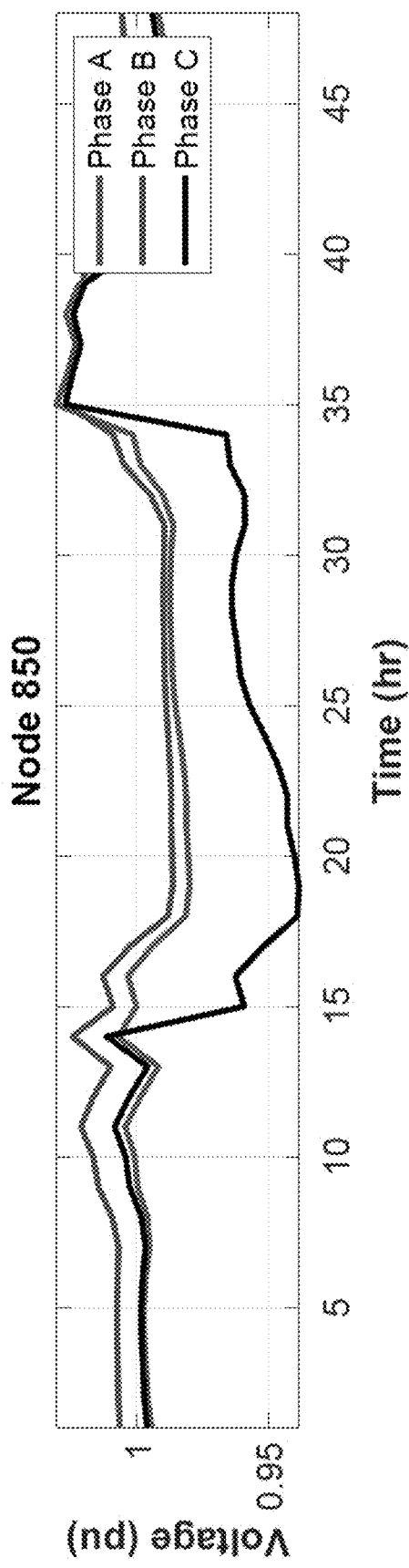
Figure 8J:
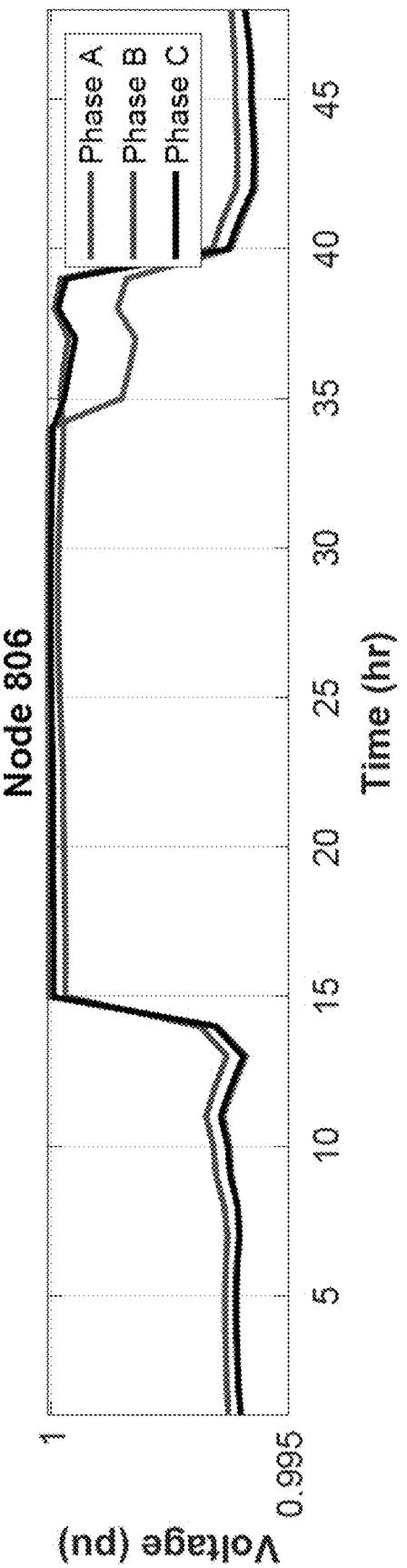
Figure 9A:
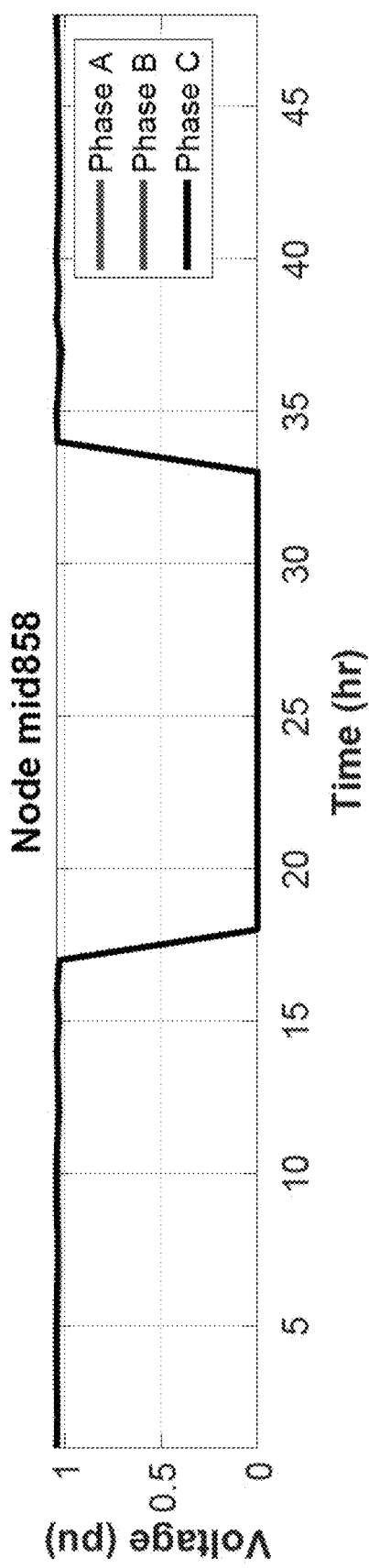
FIGS. 9A-9J show plots of voltage (pu) versus time (in hr), showing voltage performance for POS-5 at CI nodes mid858, mid834, 860, 840, 844, 824, 888, 830, 850, and 806, respectively (FIG. 9A shows node mid858, FIG. 9B shows node mid834, etc.), for Phase A, Phase B, and Phase C.
Figure 9B:
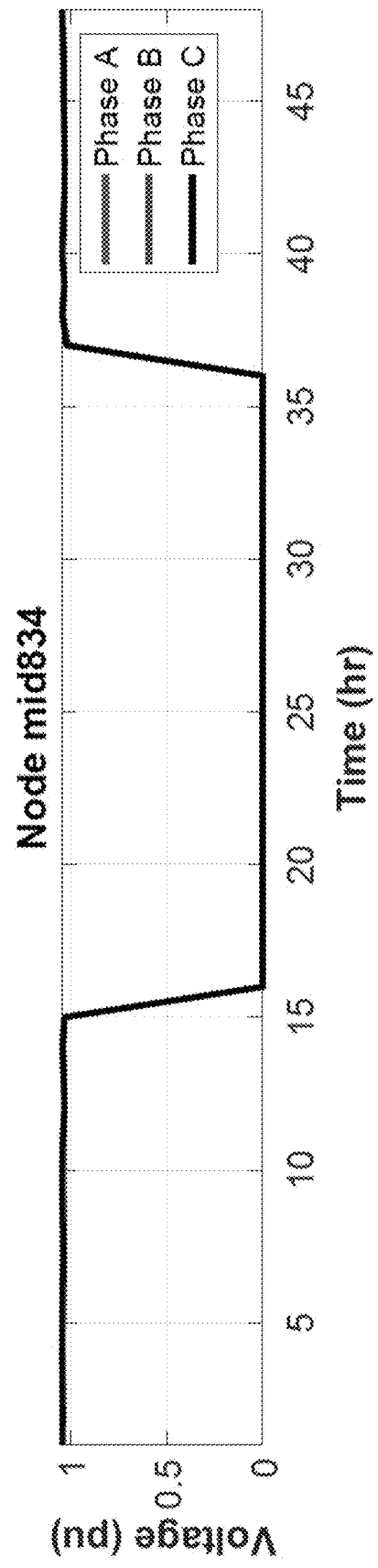
Figure 9C:
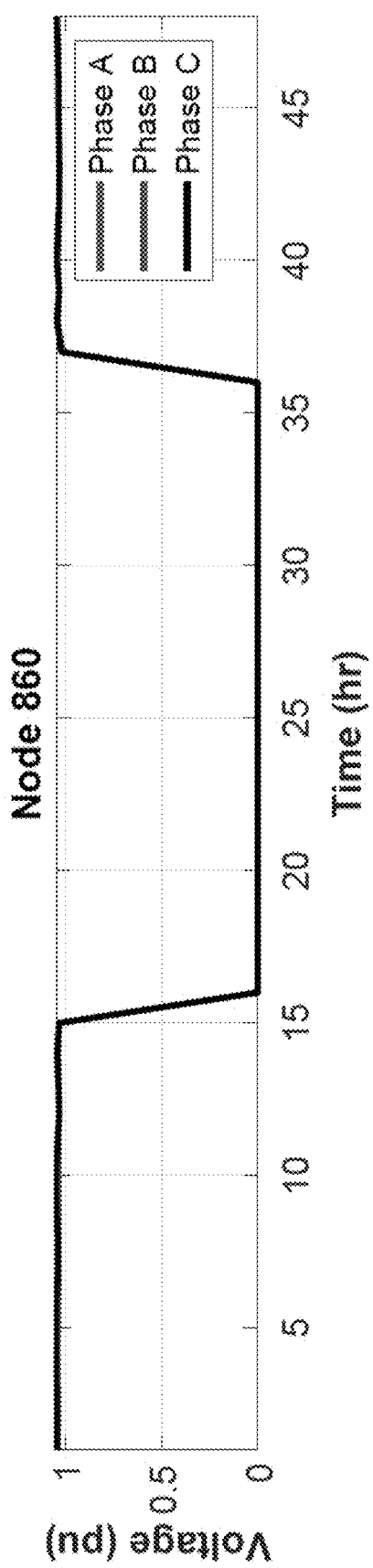
Figure 9D:
Figure 9E:
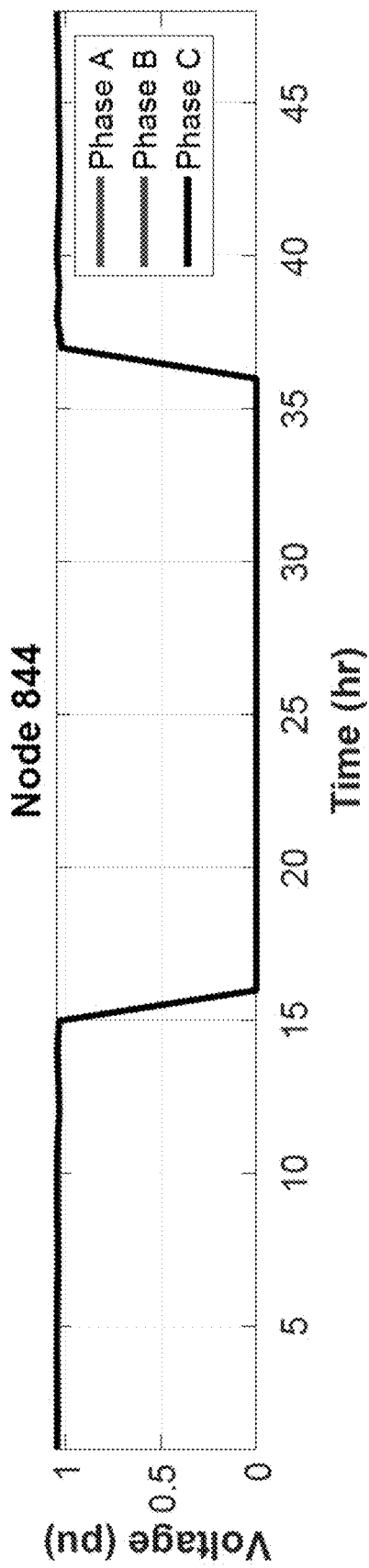
Figure 9F:
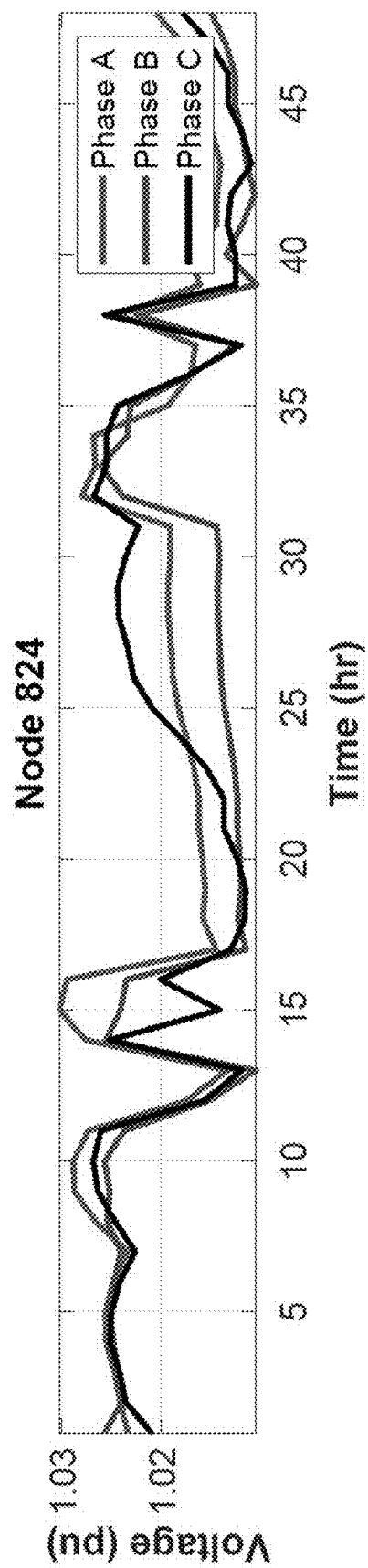
Figure 9G:
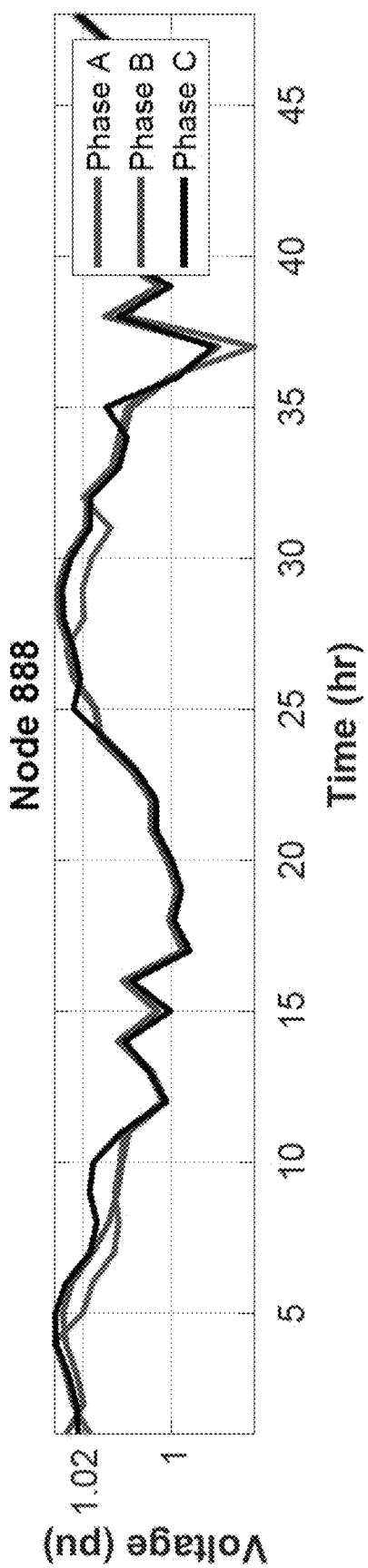
Figure 9H:
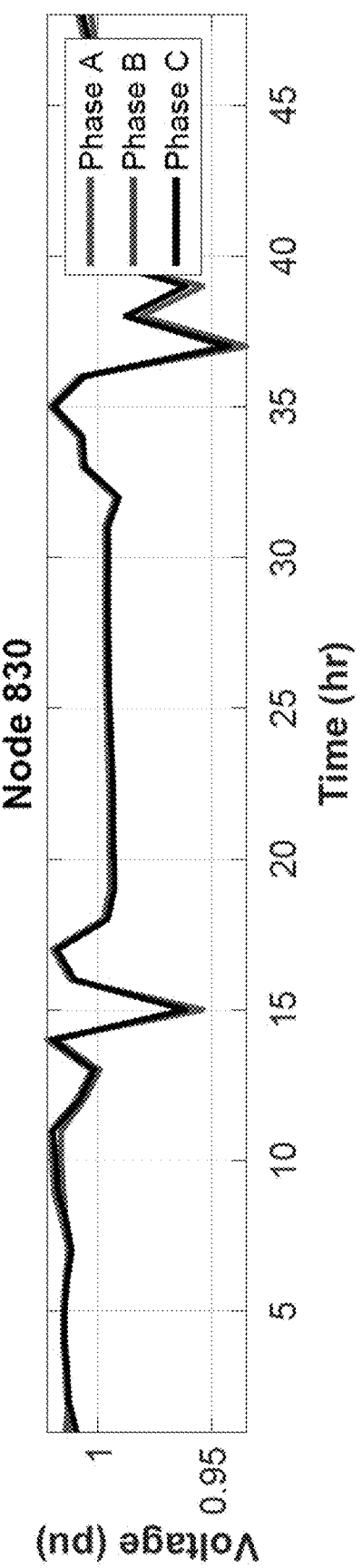
Figure 9I:
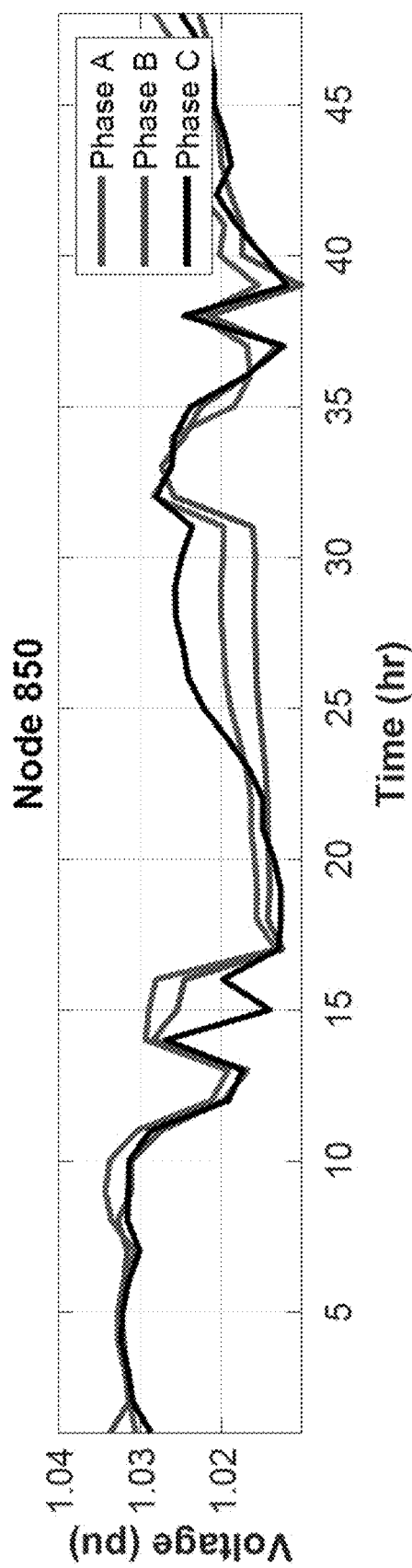
Figure 9J:
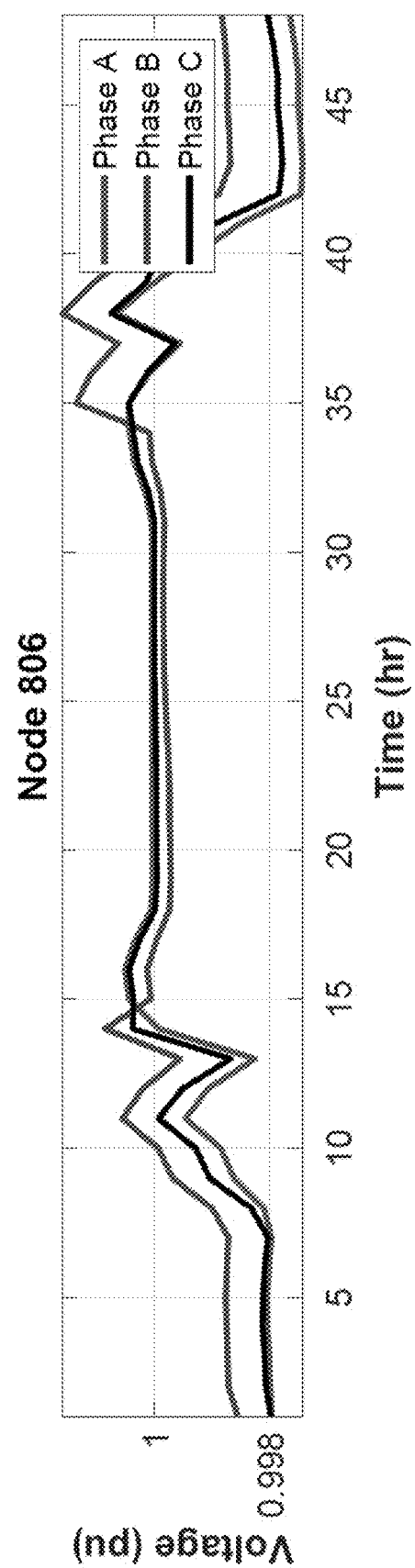
Figure 10A:
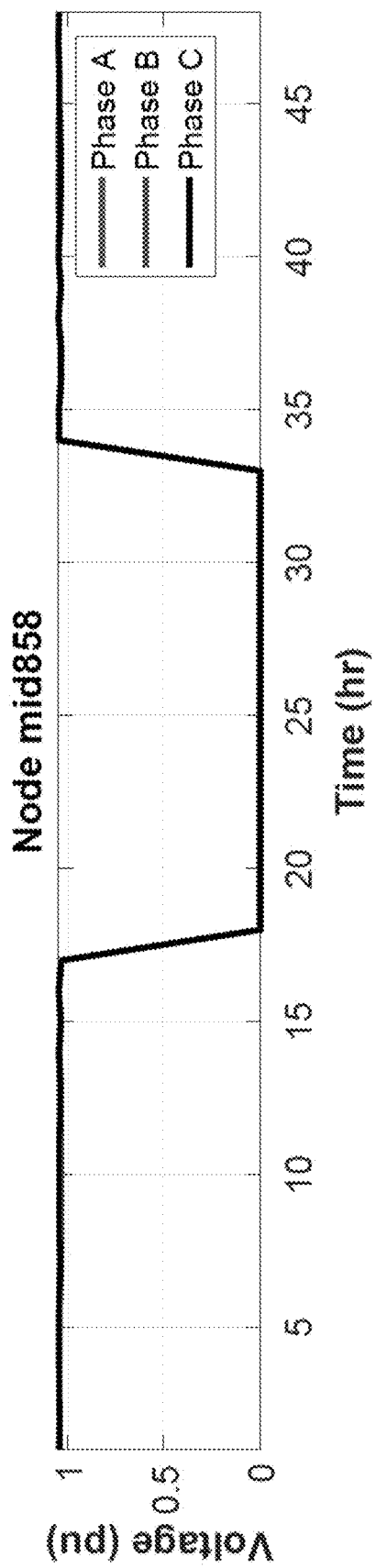
FIGS. 10A-10J show plots of voltage (pu) versus time (in hr), showing voltage performance for POS-12 at CI nodes mid858, mid834, 860, 840, 844, 824, 888, 830, 850, and 806, respectively (FIG. 10A shows node mid858, FIG. 10B shows node mid834, etc.), for Phase A, Phase B, and Phase C.
Figure 10B:
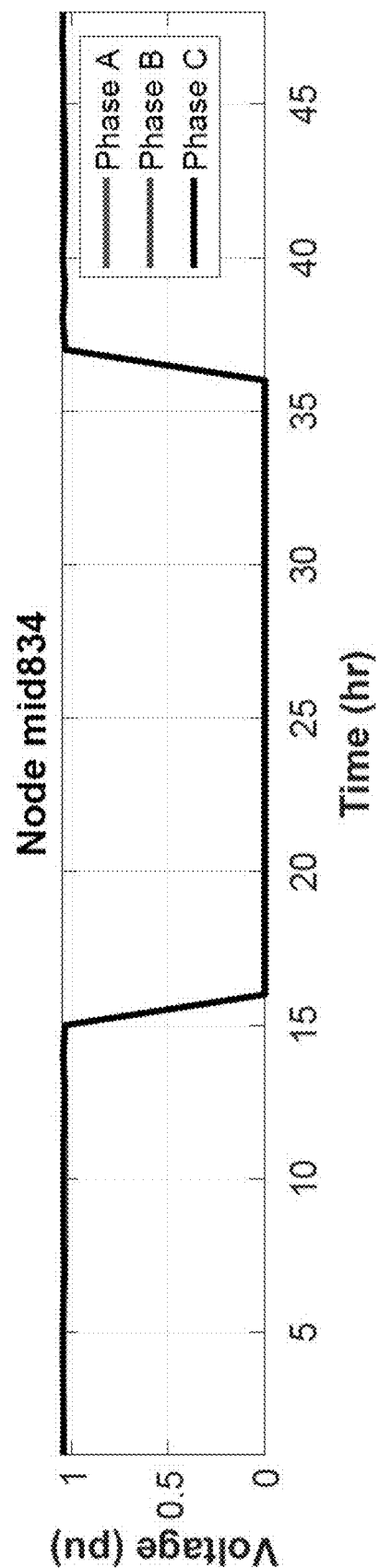
Figure 10C:
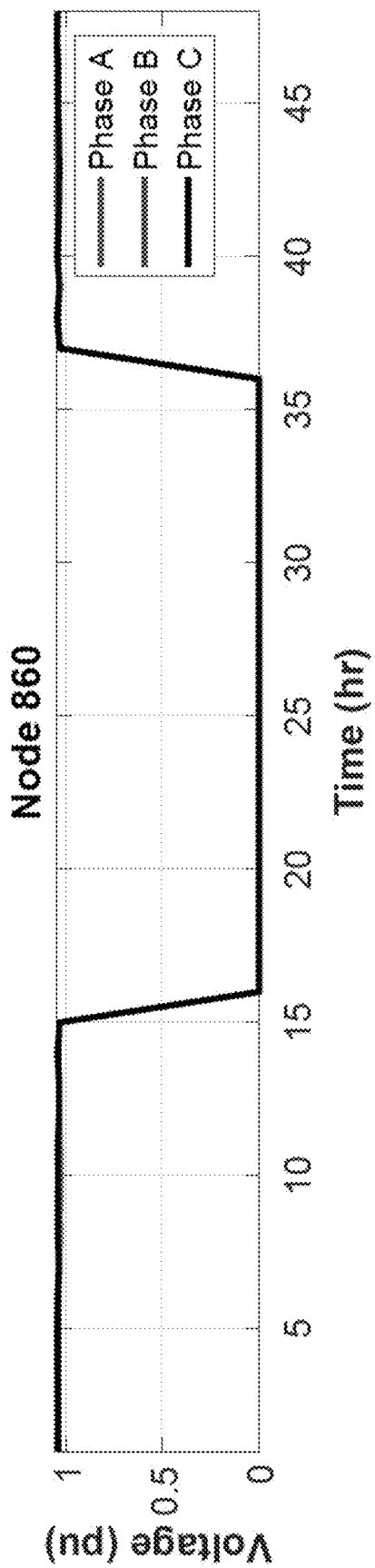
Figure 10D:
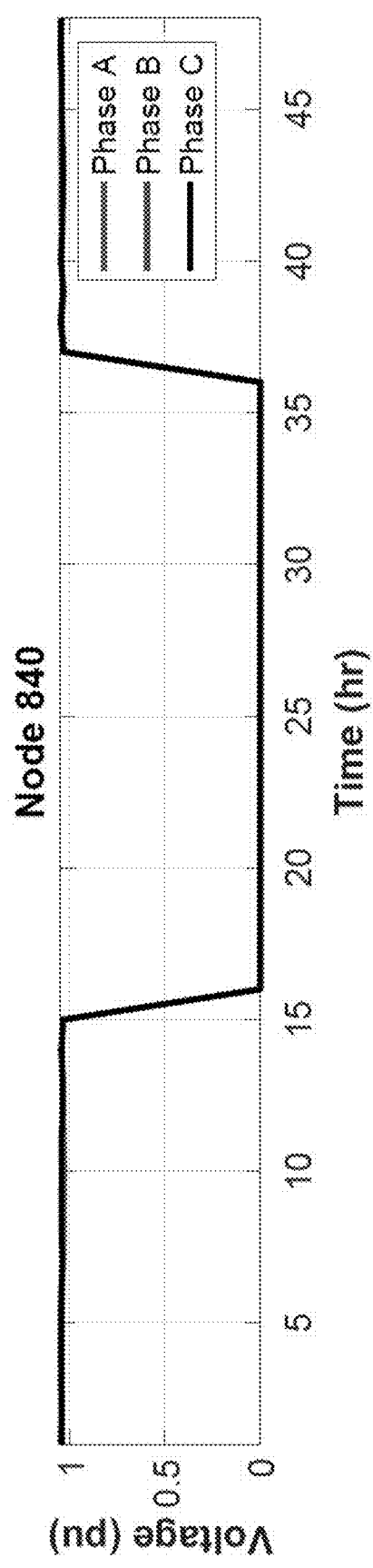
Figure 10E:
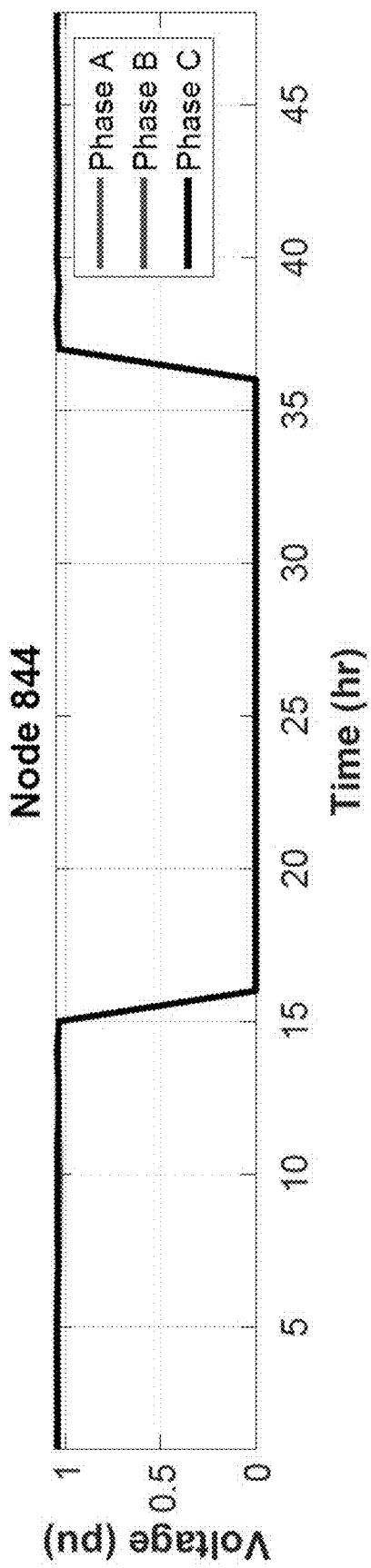
Figure 10F:
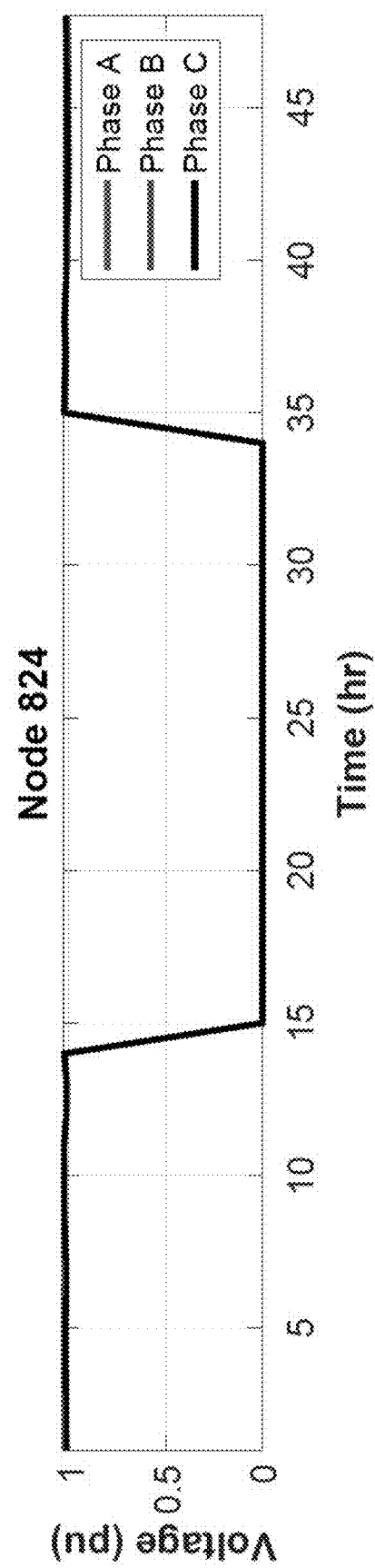
Figure 10G:
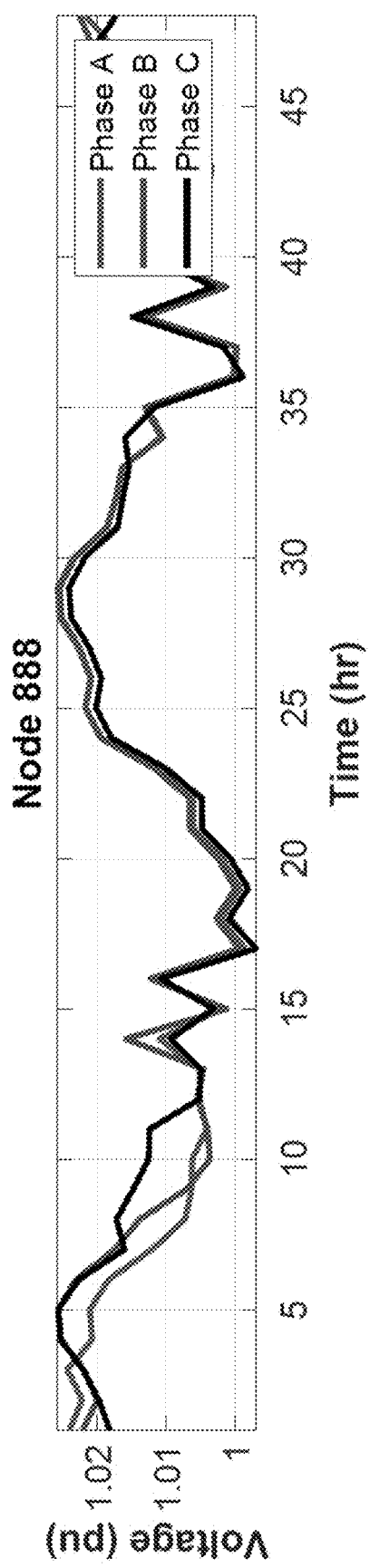
Figure 10H:
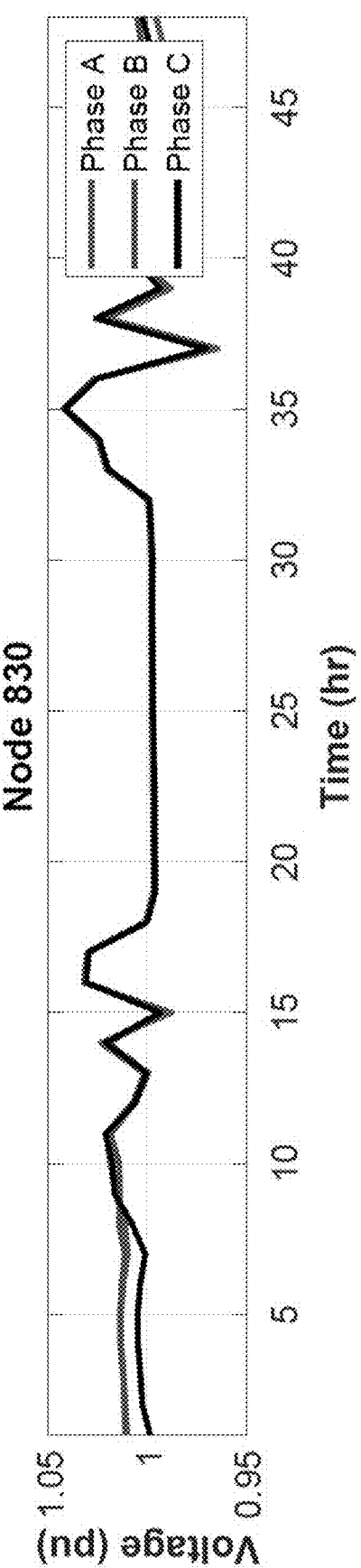
Figure 10I:
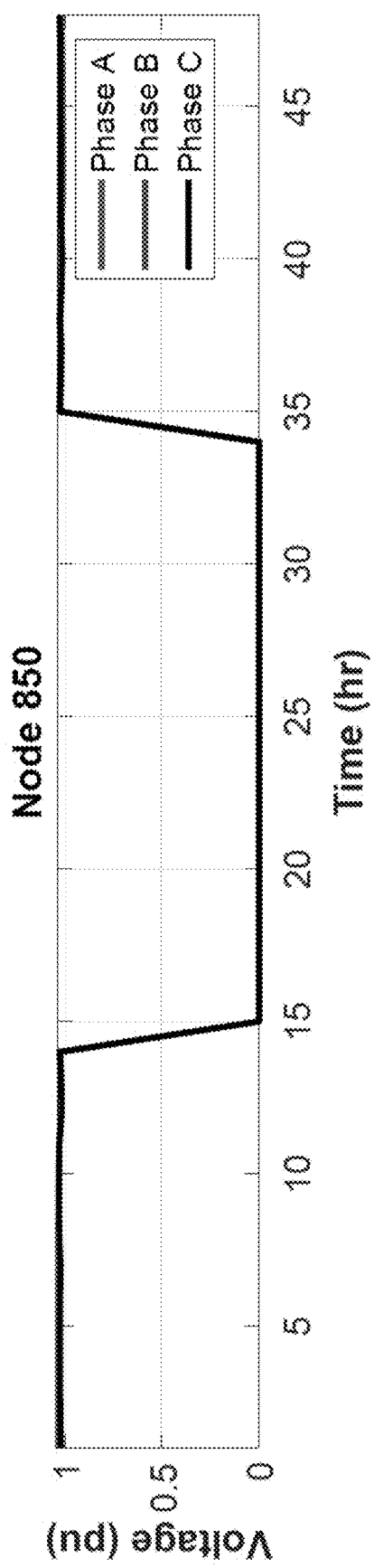
Figure 10J:
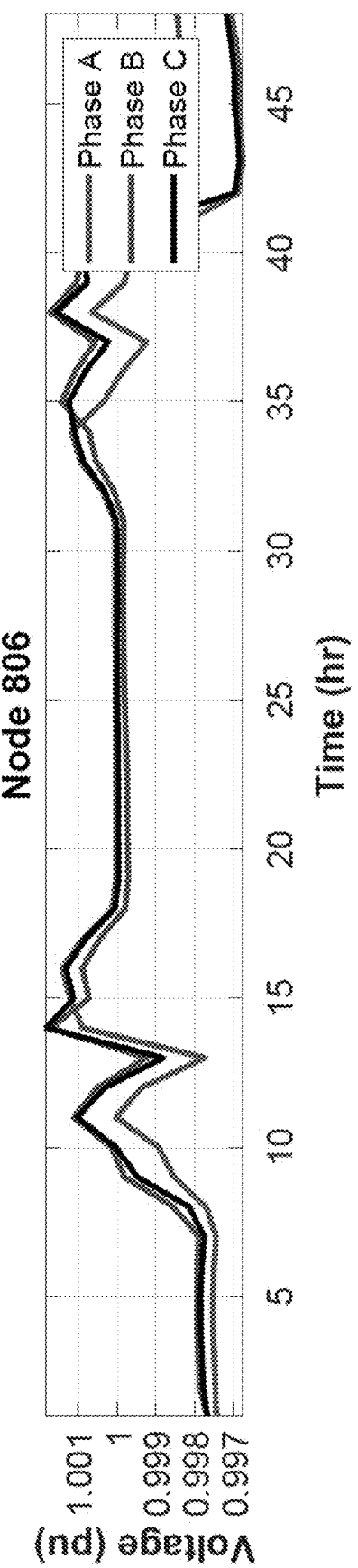

FIGS. 7A-7J show plots of voltage (per unit (pu)) versus time (in hr), showing voltage performance before PV placement at CI nodes mid858, mid834, 860, 840, 844, 824, 888, 830, 850, and 806, respectively (FIG. 7A shows node mid858, FIG. 7B shows node mid834, etc.), for Phase A, Phase B, and Phase C. FIGS. 8A-8J show plots of voltage (pu) versus time (in hr), showing voltage performance for POS-2 at CI nodes mid858, mid834, 860, 840, 844, 824, 888, 830, 850, and 806, respectively (FIG. 8A shows node mid858, FIG. 8B shows node mid834, etc.), for Phase A, Phase B, and Phase C. FIGS. 9A-9J show plots of voltage (pu) versus time (in hr), showing voltage performance for POS-5 at CI nodes mid858, mid834, 860, 840, 844, 824, 888, 830, 850, and 806, respectively (FIG. 9A shows node mid858, FIG. 9B shows node mid834, etc.), for Phase A, Phase B, and Phase C. FIGS. 10A-10J show plots of voltage (pu) versus time (in hr), showing voltage performance for POS-12 at CI nodes mid858, mid834, 860, 840, 844, 824, 888, 830, 850, and 806, respectively (FIG. 10A shows node mid858, FIG. 10B shows node mid834, etc.), for Phase A, Phase B, and Phase C.

Referring to FIGS. 7A-7J, it can be seen that nine out of ten nodes were experiencing outages during the hurricane. Referring to FIGS. 8A-8J, 9A-9J, and 10A-10J, it can be seen that during a power outage the node voltage goes to zero and many CI nodes experienced power outages in the POS-5 and POS-12 scenarios.

Figure 11:
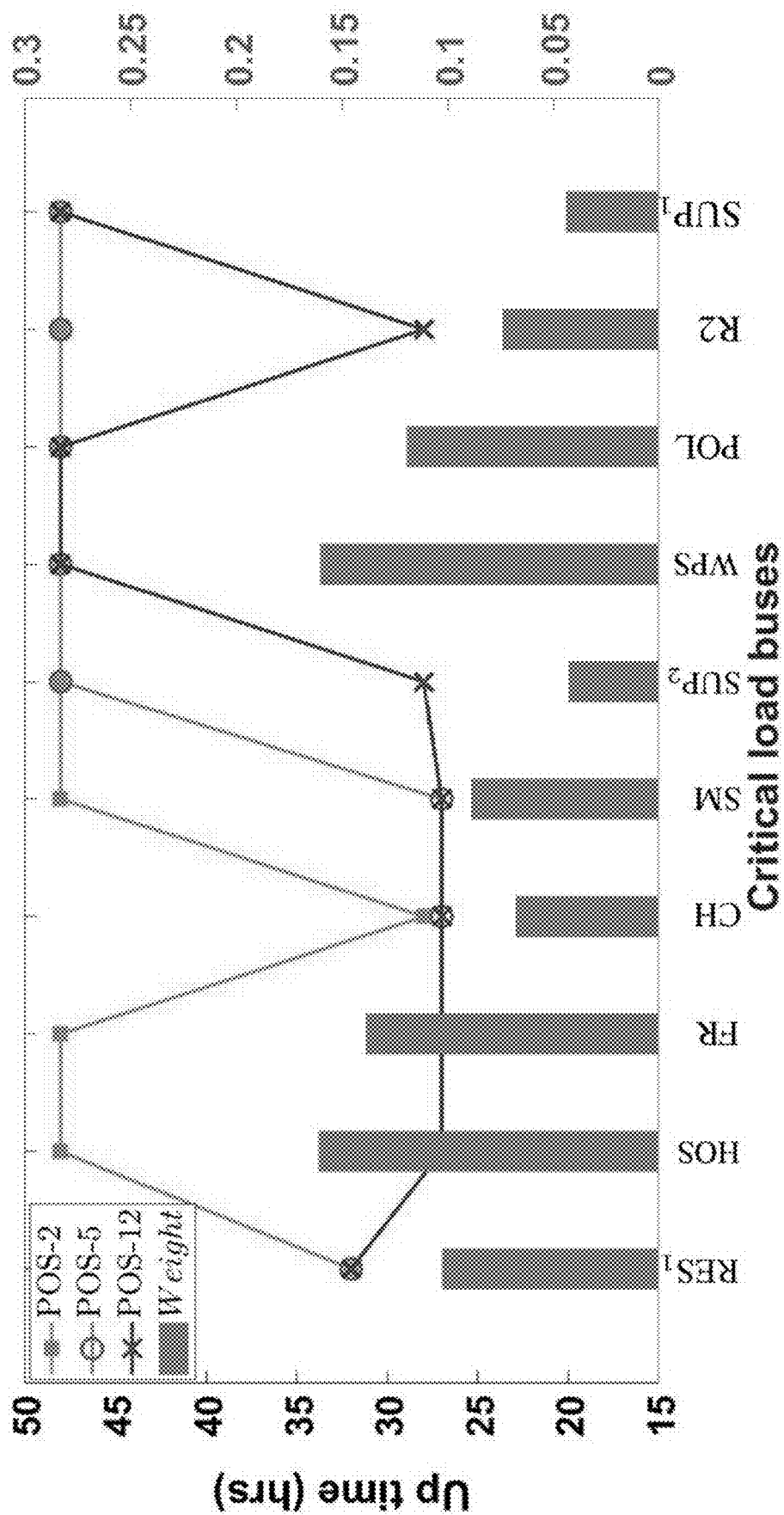
FIG. 11 shows a plot of up time (in hr) for critical load buses, showing the priority levels of CI verses the up times with the selected POSs. The curve with the square data points is for POS-2; the curve with the circle data points is for POS-5; the curve with the "x" data points is for POS-12; and the shaded areas are for the weight.

Further, the up times of the CI for the selected POSs were analyzed in comparison to the priority weights applied to those loads. Referring to FIG. 11, it can be seen that the two most critical CIs, hospital and fire station, have higher up times only with POS-2. POS-5 and POS-12 generated the lowest up times for those two loads. Therefore, in terms of resilience enhancement POS-5 and POS-12 were not good for implementation and instead POS-2 is better.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for boosting resiliency of a power distribution network (PDN), the system comprising:
   a processor; and
   a machine-readable medium in operable communication with the processor and the PDN, and having instructions stored thereon that, when executed by the processor, perform the following steps:
   i) identifying critical infrastructure (CI) nodes within the PDN;
   ii) ranking the CI nodes based on cost of power loss, with the CI node having the highest cost of power loss being ranked as a most important CI node; and
   iii) performing a multi-objective optimization to determine locations to place distributed energy resources (DERs) within the PDN, based on the ranking of the CI nodes, to boost the resiliency of the PDN.

2. The system according to claim 1, the ranking of the CI nodes utilizing a first criterion of a social importance of the respective CI node, a second criterion of an apparent power rating of a power load of the respective CI node, and a third criterion of a proximity to a substation of the respective CI node.

3. The system according to claim 2, the ranking of the CI nodes utilizing an analytic hierarchy process (AHP) on the first criterion, the second criterion, and the third criterion and comparing the first criterion, the second criterion, and the third criterion pairwise.

4. The system according to claim 3, after the AHP and pairwise comparison, the first criterion having an assigned weight of about 0.72, the second criterion having an assigned weight of about 0.19, and the third criterion having an assigned weight of about 0.08.

5. The system according to claim 1, the multi-objective optimization comprising utilizing a first objective function, a second objective function, and a third objection objective,
   the first objective function maximizing a base resilience of the PDN,
   the second objective function optimizing sizing and placement of the DERs, and
   the third objective function minimizing overall power loss of the PDN.

6. The system according to claim 5, the first objective function being $OF_1$ as follows $$OF_1 := \max|R_B| = \max\left|\frac{\sum_{i=1}^{N_{CI}} \omega^{(i)} T_{U,i}}{\sum_{i=1}^{N_{CI}} (T_{U,i} + T_{D,i})}\right|, \quad (5)$$

the second objective function being $OF_2$ as follows $$OF_2 := \max|DER_{HC}| = \max\left|\sum_{i \in N_{pv}} P_i^{pv}\right|, \text{ and} \quad (6)$$

and
the third objective function being $OF_3$ as follows $$OF_3 := \min\left|\frac{1}{T}\sum_{t=1}^{T} P_{loss}^t\right|, \quad (7)$$

where $$P_{loss} = \sum_{(i,j) \in L} r_{ij} \times \frac{P_{ij}^2 + Q_{ij}^2}{v_i},$$

and where $T_{U,i}$ is an up time of CI on node i, $T_{D,i}$ is the down time of CI on node i, $R_B$ is the base resilience, $N_{pv}$ is a set containing all the DERs in the PDN, $P_i^{pv}$ is a kilowatt (kW) rating based on DER hosing capacity of the DER at node i, L is a set of all branches in the PDN, $\forall ij \in L$, $P_{ij}$ and $Q_{ij}$ are an active power flow and a reactive power flow, respectively, from node i to j, $r_{ij}$ is a resistance between branch ij, $v_i$ is a nodal voltage at node i, t is time, and T is total time.

7. The system according to claim 1, the multi-objective optimization comprising utilizing at least one of: power flow constraints; capacitor banks reactive power and voltage regulator tap constraints; and a nodal voltage constraint.

8. The system according to claim 1, the multi-objective optimization comprising utilizing power flow constraints, capacitor banks reactive power and voltage regulator tap constraints, and a nodal voltage constraint.

9. The system according to claim 1, the multi-objective optimization comprising using a sorting and multi-objective algorithm to generate an initial population of variables.

10. The system according to claim 1, the DERs being photovoltaic (PV) cells.

11. A method for boosting resiliency of a power distribution network (PDN), the method comprising:
   i) identifying, by a processor in operable communication with the PDN, critical infrastructure (CI) nodes within the PDN;
   ii) ranking, by the processor, the CI nodes based on cost of power loss, with the CI node having the highest cost of power loss being ranked as a most important CI node; and
   iii) performing, by the processor, a multi-objective optimization to determine locations to place distributed energy resources (DERs) within the PDN, based on the ranking of the CI nodes, to boost the resiliency of the PDN.

12. The method according to claim 11, the ranking of the CI nodes utilizing a first criterion of a social importance of the respective CI node, a second criterion of an apparent power rating of a power load of the respective CI node, and a third criterion of a proximity to a substation of the respective CI node.

13. The method according to claim 12, the ranking of the CI nodes utilizing an analytic hierarchy process (AHP) on the first criterion, the second criterion, and the third criterion and comparing the first criterion, the second criterion, and the third criterion pairwise.

14. The method according to claim 13, after the AHP and pairwise comparison, the first criterion having an assigned weight of about 0.72, the second criterion having an assigned weight of about 0.19, and the third criterion having an assigned weight of about 0.08.

15. The method according to claim 11, the multi-objective optimization comprising utilizing a first objective function, a second objective function, and a third objection objective,
the first objective function maximizing a base resilience of the PDN,
the second objective function optimizing sizing and placement of the DERs, and
the third objective function minimizing overall power loss of the PDN.

16. The method according to claim 15, the first objective function being $OF_1$ as follows $$OF_1 := \max|R_B| = \max\left|\frac{\sum_{i=1}^{N_{CI}} \omega^{(i)} T_{U,i}}{\sum_{i=1}^{N_{CI}} (T_{U,i} + T_{D,i})}\right|, \quad (5)$$

the second objective function being $OF_2$ as follows $$OF_2 := \max|DER_{HC}| = \max\left|\sum_{i \in N_{pv}} P_i^{pv}\right|, \text{ and} \quad (6)$$

and
the third objective function being $OF_3$ as follows $$OF_3 := \min\left|\frac{1}{T}\sum_{t=1}^{T} P_{loss}^t\right|, \quad (7)$$

where $$P_{loss} = \sum_{(i,j) \in L} r_{ij} \times \frac{P_{ij}^2 + Q_{ij}^2}{v_i},$$

and where $T_{U,i}$ is an up time of CI on node i, $T_{D,i}$ is the down time of CI on node i, $R_B$ is the base resilience, $N_{pv}$ is a set containing all the DERs in the PDN, $P_i^{pv}$ is a kilowatt (kW) rating based on DER hosing capacity of the DER at node i, L is a set of all branches in the PDN, $\forall ij \in L$, $P_{ij}$ and $Q_{ij}$ are an active power flow and a reactive power flow, respectively, from node i to j, $r_{ij}$ is a resistance between branch ij, $v_i$ is a nodal voltage at node i, t is time, and T is total time.

17. The method according to claim 11, the multi-objective optimization comprising utilizing power flow constraints, capacitor banks reactive power and voltage regulator tap constraints, and a nodal voltage constraint.

18. The method according to claim 11, the multi-objective optimization comprising using a sorting and multi-objective algorithm to generate an initial population of variables.

19. The method according to claim 11, the DERs being photovoltaic (PV) cells.

20. A system for boosting resiliency of a power distribution network (PDN), the system comprising:
a processor; and
a machine-readable medium in operable communication with the processor and the PDN, and having instructions stored thereon that, when executed by the processor, perform the following steps:
i) identifying critical infrastructure (CI) nodes within the PDN;
ii) ranking the CI nodes based on cost of power loss, with the CI node having the highest cost of power loss being ranked as a most important CI node; and
iii) performing a multi-objective optimization to determine locations to place distributed energy resources (DERs) within the PDN, based on the ranking of the CI nodes, to boost the resiliency of the PDN,
the ranking of the CI nodes utilizing a first criterion of a social importance of the respective CI node, a second criterion of an apparent power rating of a power load of the respective CI node, and a third criterion of a proximity to a substation of the respective CI node,
the ranking of the CI nodes utilizing an analytic hierarchy process (AHP) on the first criterion, the second criterion, and the third criterion and comparing the first criterion, the second criterion, and the third criterion pairwise,
after the AHP and pairwise comparison, the first criterion having an assigned weight of about 0.72, the second criterion having an assigned weight of about 0.19, and the third criterion having an assigned weight of about 0.08,
the multi-objective optimization comprising utilizing a first objective function, a second objective function, and a third objection objective,
the first objective function maximizing a base resilience of the PDN,
the second objective function optimizing sizing and placement of the DERs, and
the third objective function minimizing overall power loss of the PDN,
the first objective function being $OF_1$ as follows $$OF_1 := \max|R_B| = \max\left|\frac{\sum_{i=1}^{N_{CI}} \omega^{(i)} T_{U,i}}{\sum_{i=1}^{N_{CI}} (T_{U,i} + T_{D,i})}\right|, \quad (5)$$

the second objective function being $OF_2$ as follows $$OF_2 := \max|DER_{HC}| = \max\left|\sum_{i \in N_{pv}} P_i^{pv}\right|, \quad (6)$$

the third objective function being $OF_3$ as follows $$OF_3 := \min\left|\frac{1}{T}\sum_{t=1}^{T} P_{loss}^t\right|, \quad (7)$$

where $$P_{loss} = \sum_{(i,j) \in L} r_{ij} \times \frac{P_{ij}^2 + Q_{ij}^2}{v_i},$$

and where $T_{U,i}$ is an up time of CI on node i, $T_{D,i}$ is the down time of CI on node i, $R_B$ is the base resilience, $N_{pv}$ is a set containing all the DERs in the PDN, $P_f^{pv}$ is a kilowatt (kW) rating based on DER hosing capacity of the DER at node i, L is a set of all branches in the PDN, $\forall ij \in L$, $P_{ij}$ and $Q_{ij}$ are an active power flow and a reactive power flow, respectively, from node i to j, $r_{ij}$ is a resistance between branch ij, $v_i$ is a nodal voltage at node i, t is time, and T is total time, the multi-objective optimization comprising utilizing power flow constraints, capacitor banks reactive power and voltage regulator tap constraints, and a nodal voltage constraint, the multi-objective optimization comprising using a sorting and multi-objective algorithm to generate an initial population of variables, and the DERs being photovoltaic (PV) cells.

\* \* \* \* \*